(12) United States Patent
Drapeau et al.

(10) Patent No.: US 11,054,583 B2
(45) Date of Patent: Jul. 6, 2021

(54) OPTICAL FIBER ALIGNMENT DEVICE WITH SELF-HEALING REFRACTIVE INDEX-MATCHING GEL

(71) Applicant: COMMSCOPE TECHNOLOGIES LLC, Hickory, NC (US)

(72) Inventors: Richard J. Drapeau, Victoria, MN (US); Gary William Adams, Holly Springs, NC (US); Steven C. Zimmel, Minneapolis, MN (US)

(73) Assignee: CommScope Technologies LLC, Hickory, NC (US)

( * ) Notice: Subject to any disclaimer, the term of this patent is extended or adjusted under 35 U.S.C. 154(b) by 0 days.

(21) Appl. No.: 16/620,215

(22) PCT Filed: Jun. 6, 2018

(86) PCT No.: PCT/US2018/036323
§ 371 (c)(1),
(2) Date: Dec. 6, 2019

(87) PCT Pub. No.: WO2018/226872
PCT Pub. Date: Dec. 13, 2018

(65) Prior Publication Data
US 2020/0116947 A1 Apr. 16, 2020

Related U.S. Application Data

(60) Provisional application No. 62/515,942, filed on Jun. 6, 2017.

(51) Int. Cl.
*G02B 6/38* (2006.01)
*C08G 77/00* (2006.01)
*C08L 83/04* (2006.01)

(52) U.S. Cl.
CPC ............ *G02B 6/382* (2013.01); *C08G 77/80* (2013.01); *C08L 83/04* (2013.01); *G02B 6/3809* (2013.01); *G02B 6/3839* (2013.01)

(58) Field of Classification Search
CPC .... G02B 6/382; G02B 6/3809; G02B 6/3839; C08G 77/80; C08L 83/04
See application file for complete search history.

(56) References Cited

U.S. PATENT DOCUMENTS

| 3,020,260 A | 8/1960 | Nelson |
| 3,445,420 A | 5/1969 | Kookootsedes et al. |

(Continued)

FOREIGN PATENT DOCUMENTS

| CN | 105802576 A | 7/2016 |
| EP | 0 209 399 A2 | 1/1987 |

(Continued)

OTHER PUBLICATIONS

International Search Report and Written Opinion of the International Searching Authority for International Patent Application No. PCT/US2018/036323 dated Sep. 20, 2018, 14 pages.

(Continued)

*Primary Examiner* — Andrew Jordan
(74) *Attorney, Agent, or Firm* — Merchant & Gould, P.C.

(57) ABSTRACT

A fiber alignment device is provided that includes a curable refractive index-matching gel that exhibits self-cleaning and self-healing characteristics upon multiple cycles of insertion and removal of an optical fiber.

24 Claims, 14 Drawing Sheets

(56) References Cited

U.S. PATENT DOCUMENTS

| | | | |
|---|---|---|---|
| 3,624,022 A | 11/1971 | Ross | |
| 4,064,027 A | 12/1977 | Gant | |
| 4,163,081 A | 7/1979 | Schulz | |
| 4,196,273 A | 4/1980 | Imai et al. | |
| 4,364,809 A | 12/1982 | Sato et al. | |
| 4,369,284 A | 1/1983 | Chen | |
| 4,448,482 A * | 5/1984 | Lathlaen | G02B 6/3809 385/64 |
| 4,634,207 A | 1/1987 | Debbaut | |
| 4,634,216 A | 1/1987 | Calevo et al. | |
| 4,664,732 A * | 5/1987 | Campbell | G01M 11/35 156/158 |
| 4,680,233 A | 7/1987 | Camin et al. | |
| 4,716,183 A | 12/1987 | Gamarra et al. | |
| 4,770,641 A | 9/1988 | Rowlette | |
| 4,777,063 A | 10/1988 | Dubrow et al. | |
| 4,852,646 A | 8/1989 | Dittmer et al. | |
| 4,942,270 A | 7/1990 | Gamarra | |
| 5,079,300 A | 1/1992 | Dubrow et al. | |
| 5,140,746 A | 8/1992 | Debbaut | |
| 5,177,143 A | 1/1993 | Chang et al. | |
| 5,357,057 A | 10/1994 | Debbaut | |
| 5,783,115 A | 7/1998 | Bilkadi et al. | |
| 6,516,131 B1 | 2/2003 | Tullis | |
| 6,603,901 B1 * | 8/2003 | Hale | G02B 6/02104 385/123 |
| 6,893,280 B2 | 5/2005 | Thompson et al. | |
| 7,628,548 B2 * | 12/2009 | Benjamin | G02B 6/382 385/125 |
| 7,708,476 B2 | 5/2010 | Liu | |
| 7,742,670 B2 * | 6/2010 | Benjamin | G02B 6/382 385/125 |
| 8,152,387 B2 | 4/2012 | Benjamin et al. | |
| 8,175,426 B2 | 5/2012 | Shacklette | |
| 8,870,466 B2 | 10/2014 | Lu | |
| 9,388,284 B2 * | 7/2016 | Liu | C08L 83/00 |
| 9,575,263 B2 | 2/2017 | Gurreri et al. | |
| 9,718,927 B2 * | 8/2017 | Liu | C08K 5/5419 |
| 9,798,091 B2 * | 10/2017 | Samal | G02B 6/3849 |
| 10,197,745 B2 | 2/2019 | Watte et al. | |
| 2009/0087150 A1 | 4/2009 | Benjamin et al. | |
| 2009/0087151 A1 * | 4/2009 | Benjamin | G02B 6/382 385/98 |
| 2010/0014817 A1 * | 1/2010 | Liu | G02B 6/02314 385/99 |
| 2010/0054675 A1 * | 3/2010 | Benjamin | G02B 6/3806 385/98 |
| 2014/0309380 A1 * | 10/2014 | Liu | C08L 83/04 525/474 |
| 2015/0357741 A1 | 12/2015 | Nazzaro et al. | |
| 2015/0378109 A1 | 12/2015 | Samal et al. | |
| 2016/0289390 A1 * | 10/2016 | Liu | C08G 77/04 |
| 2018/0120515 A1 * | 5/2018 | Samal | G02B 6/3849 |
| 2020/0116947 A1 * | 4/2020 | Drapeau | G02B 6/3839 |

FOREIGN PATENT DOCUMENTS

| | | |
|---|---|---|
| WO | 86/01634 A1 | 3/1986 |
| WO | 96/23007 A1 | 8/1996 |
| WO | 2012/112344 A1 | 8/2012 |
| WO | 2013/117598 A2 | 8/2013 |
| WO | 2014/118224 A1 | 8/2014 |
| WO | 2014/118225 A1 | 8/2014 |
| WO | 2018/020022 A1 | 2/2018 |
| WO | 2018/144128 A2 | 8/2018 |

OTHER PUBLICATIONS

Smartgel OC-431A-LVP, Safety Data Sheet, Nye Lubricants, Inc., 7 pages (2015).
Smartgell OC-431A-LVP-Nye Synthetic Lubricants, 1 page (2015).
Andisil® VS, Two Part RTV, AB Specialty Silicones, 1 page (2015).
Dynasylan® 40, Product Information, Evonik Resource Efficiency GmbH, 3 pages (2015).
Vinyl Terminated Polyphenylmethylsiloxane, Safety Data Sheet PMV-9925, Gelest Inc., 5 pages (2014).
Standard Test Methods for Cone Penetration of Lubricating Grease, ASTM Designation: D 217-02, Designation: 50/88, 14 pages (Admitted prior art as of Jun. 6, 2017).
"Silicone Fluids: Stable, Inert Media, Engineering and Design Properties for: Heat Transfer, Mechanical, Lubrication, Smart Fluid Dielectric and Optical Applications" Gelest, 32 pages (2012).
1,3,5-Triphenyltrimethylcyclotrisiloxane, 90%, Safety Data Sheet SIT8705.0, Gelest (2015).
Sigma-Alrich, Product Specification, 1 page (Admitted prior art as of Jun. 6, 2017).
"Simply Brilliant, SmartGel® Index-matching gels for LEDs", Nye Synthetic Lubricants, 2 pages (2006).
Extended European Search Report for Application No. 18812657.7 dated Feb. 10, 2021.
Office action received Jan. 13, 2021 for corresponding Chinese patent application No. 201880037198.7 and English translation thereof.

* cited by examiner

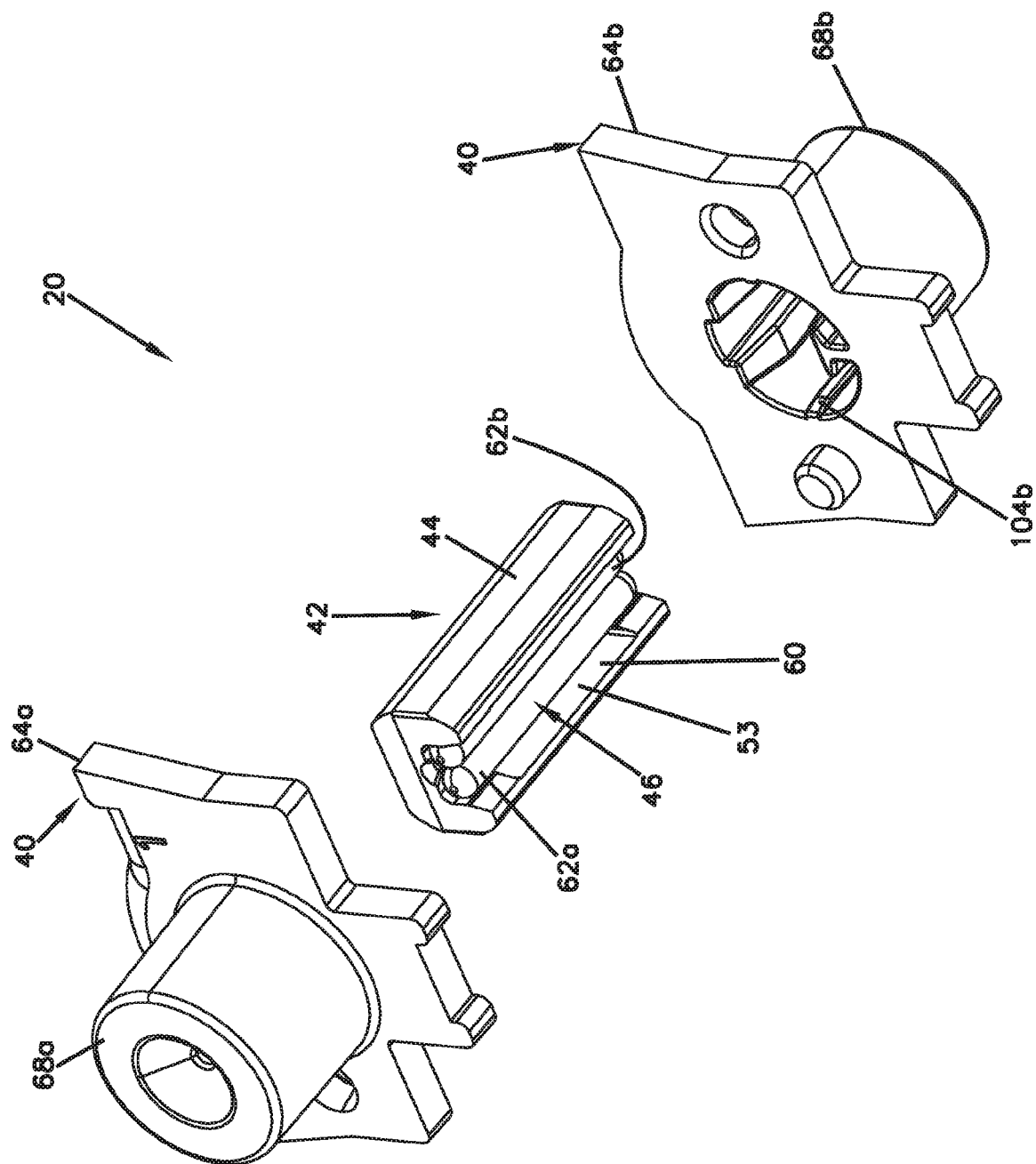

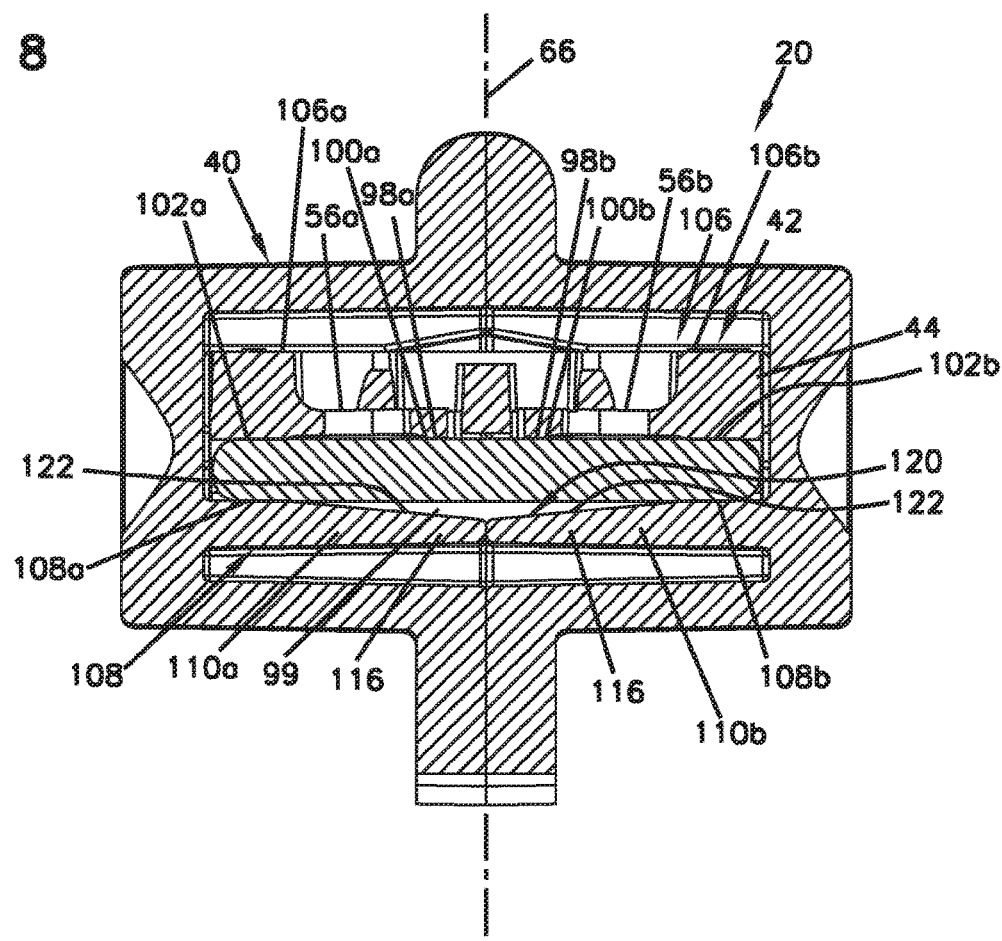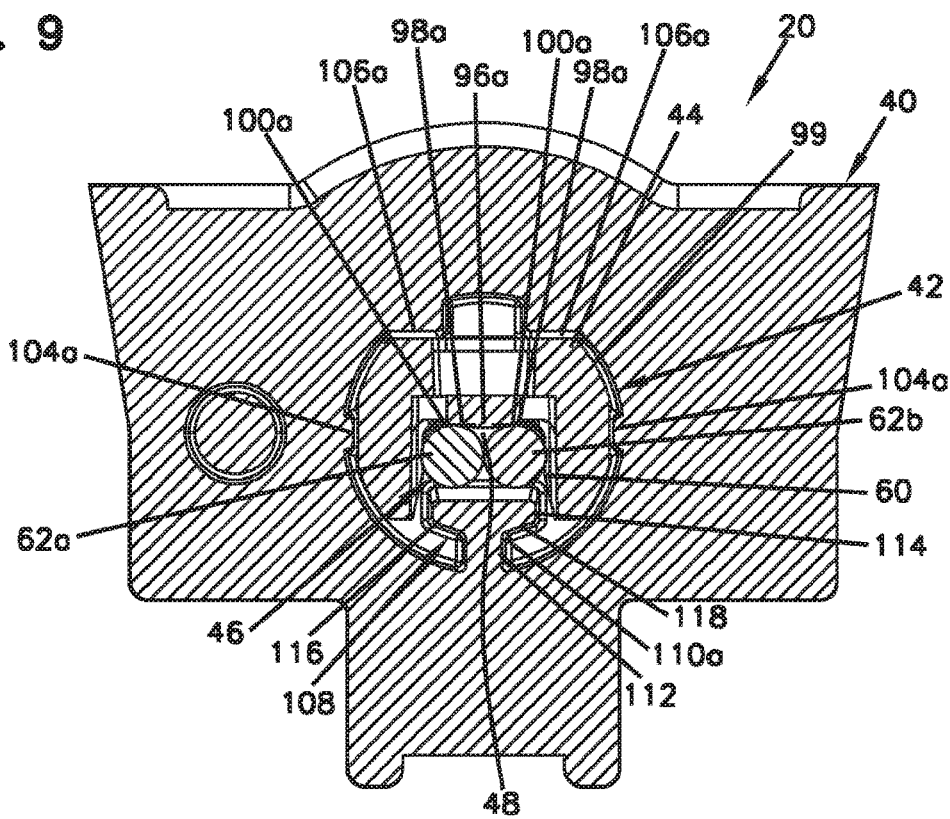

OPTICAL FIBER ALIGNMENT DEVICE WITH SELF-HEALING REFRACTIVE INDEX-MATCHING GEL

CROSS-REFERENCE TO RELATED APPLICATION

This application is a National Stage Application of PCT/US2018/036323, filed on Jun. 6, 2018, which claims the benefit of U.S. Patent Application Ser. No. 62/515,942, filed on Jun. 6, 2017, the disclosures of which are incorporated herein by reference in their entireties. To the extent appropriate, a claim of priority is made to each of the above disclosed applications.

BACKGROUND

Fiber optic communication systems are becoming prevalent in part because service providers want to deliver high bandwidth communication capabilities (e.g., data and voice) to customers. Fiber optic communication systems employ a network of fiber optic cables to transmit large volumes of data and voice signals over relatively long distances. Optical fiber connectors are an important part of most fiber optic communication systems. Fiber optic connectors allow two optical fibers to be quickly optically connected without requiring a splice. Fiber optic connectors can be used to optically interconnect two lengths of optical fiber. Fiber optic connectors can also be used to interconnect lengths of optical fiber to passive and active equipment.

A typical fiber optic connector includes a ferrule assembly supported at a distal end of a connector housing. A spring is used to bias the ferrule assembly in a distal direction relative to the connector housing. The ferrule functions to support an end portion of at least one optical fiber (in the case of a multi-fiber ferrule, the ends of multiple fibers are supported). When two fiber optic connectors are interconnected, the distal end faces of the ferrules abut one another and the ferrules are forced proximally relative to their respective connector housings against the bias of their respective springs.

Another type of fiber optic connector can be referred to as a ferrule-less fiber optic connector. In a ferrule-less fiber optic connector, an end portion of an optical fiber corresponding to the ferrule-less fiber optic connector is not supported by a ferrule. Instead, the end portion of the optical fiber is a free end portion. Similar to the ferruled connectors described above, fiber optic adapters can be used to assist in optically coupling together two ferrule-less fiber optic connectors. Such fiber optic adapters can include specialized fiber alignment structures adapter to receive bare optical fibers.

V-grooves are commonly used in prior-art ferrule-less fiber optic alignment devices. An example is the V-groove method described in U.S. Pat. No. 6,516,131 used for alignment of optical fiber ends. The V-groove is uni-directionally or bi-directionally tapered for enabling easy positioning of the fibers. Optical fibers are pressed into the V-grooves and line contact between the optical fibers and the surfaces of the V-grooves assists in providing precise alignment of the optical fibers. In one example, two optical fibers desired to be optically connected together are positioned end-to-end within a V-groove such that the V-groove functions to co-axially align the optical fibers. End faces of the aligned optical fibers can abut one another. Other Example ferrule-less fiber optic connectors are disclosed by PCT Publication No. WO 2012/112344; PCT Publication No. WO 2013/117598 and U.S. Pat. No. 8,870,466.

For optical couplings to be effective, it is important for the end faces of the optical fiber being coupled together to be clean. Improvements are needed in this area.

Air gaps between glass fibers in optical fiber network connectors cause problems because the refractive index of air is lower than the refractive index of glass. Refractive index-matching gels are employed to displace air gaps and reduce signal loss or reflection within the optical fiber networks and protect the optical interface from the environment. Index matching agents range from fluids, to pastes, to greases, to gels. Thixotropic greases and gels have the ability to stay where they are placed, which is important for certain applications. Gels further bring a cross-linked structure memory, which may improve self-healing or re-sealing characteristics.

Prior art index-matching gels such as thixotropic greases or crosslinked cured gels may exhibit good index match to the glass fiber, high optical clarity, and low absorption loss; however upon repeated removal and replacement of optical fibers, existing gels may exhibit tracking, or tear-out, wherein the gel adheres to the optical fiber.

U.S. Pat. No. 4,634,216, incorporated herein by reference in its entirety, discloses index matching silicon gels preferably with sufficiently low hardness to allow the fiber end sections to be easily introduced and positioned. The gel preferably exhibits self-cleaning. Should any dust inadvertently collect on the endface of a fiber before insertion in a housing or connector, the gel through its adhesive capacity wipes off the fiber end section, as it is inserted into the housing and thus into the gel, thereby gathering the dust. No specific formulations are provided.

U.S. Pat. No. 4,777,063, incorporated herein by reference in its entirety, discloses curable organopolysiloxane compositions comprising at least about 50% by weight of a general organopolysiloxane having no more than two vinyl groups and up to about 50% by weight of a crosslink additive which is a polysiloxane having at least 3 vinyl groups and which is copolymerizable with the organopolysiloxane. This curable composition may be cured by heat, chemical or, preferably, radiation curing techniques to produce crosslinked polysiloxane materials.

U.S. Pat. No. 5,079,300, incorporated herein by reference in its entirety, discloses cured crosslinked organopolysiloxane compositions, for example, using two component reactive silicone compositions employed in various ratios to obtain different hardness characteristics. Materials comprising first and second components contain vinyl groups and silicon bonded hydrogen atoms, for example, with use of a platinum catalyst to facilitate reaction and cure.

U.S. Pat. No. 5,783,115, incorporated herein by reference in its entirety, discloses index-matching gel compositions that are optically transmissive, silica-containing compositions which exhibit a small change of refractive index with respect to changes in temperature ($dn_g/dT$). The compositions are derived from silica sols dispersed in liquid organic polymers. In one example, a transparent crosslinkable sol containing silica was prepared by mixing silica organosol A into a tetrahydrofuran solution of an epoxy resin.

US 2009/0087150, incorporated herein by reference in its entirety, discloses a polymer based index-matching gel preferably within a viscosity at 25° C. of 3 Pa-s to 100 Pa-s, although no specific formulations are provided.

Prior art commercial cross-linked gels such as NYO-GEL® OCK-451A (Nye Lubricants, Inc., Fairhaven Mass.) can achieve index match, and re-seal, but one problem is they may start to exhibit tear-out after a number of cycles. For example, as shown in FIG. 14, prior art cross-linked gel exhibits tear-out as evidenced by traces of gel visually apparent along the withdrawn optical fiber.

Prior art commercial thixotropic greases such as NYO-GEL® OC431A LVP can exhibit good index-match, with good fiber release, but may exhibit another problem in that they fail to self-heal as exhibited by tracking or passage evident after a number of cycles. For example, as shown in FIG. 15, prior art thixotropic grease exhibits tracking after withdrawal of the optical fiber, thus fails to adequately self-heal.

Thus, one problem to be solved is to provide a gel that exhibits good protection of substrates such as optical fiber interfaces from the environment, good index-match to optical fibers, self-cleaning properties, and further exhibits self-healing properties without exhibiting tear-out along a withdrawn optical fiber, particularly after several cycles.

SUMMARY

A fiber alignment device includes a curable refractive index-matching gel that exhibits self-cleaning and self-healing characteristics upon multiple cycles of insertion and removal of an optical fiber. Refractive index-matching self-curing gels are provided to displace air gaps and reduce signal loss or reflection within the optical fiber networks and protect the optical interface from the environment.

Cured organopolysiloxane gel compositions are provided having unexpectedly superior combinations of elongation, tensile strength, and toughness, accepting high levels of diluent without significant syneresis, particularly while under compression, while maintaining index-matching, self-curing and self-cleaning characteristics.

In some embodiments, a cured refractive index-matching gel composition is provided comprising a crosslinked polysiloxane, and a nonreactive polysiloxane diluent, wherein the refractive index of the diluent is higher than the refractive index of the crosslinked polysiloxane.

In some embodiments, a cured refractive index-matching gel composition is provided, wherein the gel composition is self-healing as indicated by re-seal to be liquid tight upon water submersion after at least 10 seconds following removal of a 125 micron optical fiber from the gel composition within a connector.

In some embodiments, a cured refractive index-matching gel composition is provided, wherein the crosslinked polysiloxane is prepared from a polysiloxane composition comprising a first reactive polysiloxane component, and a second reactive component capable of reacting with and curing the first component, wherein the first reactive polysiloxane component has at least two reactive groups. In some embodiments, the first reactive polysiloxane component is selected from the group consisting of hydroxy-, alkoxy-, acyloxy-, amino-, oxime-, hydrogen- and vinyl-dimethyl terminated polydimethylsiloxanes, and dihydroxy-, diacyloxy-, diamino-, dioxime-, dialkoxy-, dihydrogen- and divinyl-methyl terminated polydimethylsiloxanes and hydroxy-, alkoxy-, acyloxy-, amino-, oxime-, hydrogen- and vinyl-dimethyl and dihydroxy-, diacyloxy-, diamino-, dioxime-, dialkoxy-, dihydrogen- and divinyl-methyl terminated dimethylsiloxane copolymers with diphenyl siloxanes.

In some embodiments, a cured refractive index-matching gel composition is provided, wherein the crosslinked polysiloxane is prepared from a polysiloxane composition comprising a first reactive polysiloxane component, and a second reactive component capable of reacting with and curing the first component wherein the second reactive component has at least three reactive groups, for example, wherein the second reactive component is selected from the group consisting of tetrakis(dimethylsiloxy) silane, methyltris(dimethylsiloxy)silane, phenyl-tris(dimethylsiloxy)silane, tetraethoxysilane, tetramethoxysilane, phenyl triethoxysilane, methyl triethoxysilane, phenyl triacetoxysilane, 1,3,5-trimethyltrivinyl cyclotrisiloxane, 1,3,5,7-tetramethyltetravinyl cyclotetrasiloxane, and 1,3,5,7-tetra-methylcyclotetrasiloxane. In some embodiments, the second reactive component has at least four reactive groups. In some embodiments, a mixture of second reactive components comprising 3 and 4 reactive groups is employed to control Mw between crosslinks.

In some embodiments, a cured refractive index-matching gel composition is provided comprising a crosslinked polysiloxane, and a nonreactive polysiloxane diluent, wherein the nonreactive polysiloxane diluent comprises a cyclosiloxane having at least one phenyl substituent.

In some embodiments, a cured refractive index-matching gel composition is provided comprising a crosslinked polysiloxane, and a nonreactive polysiloxane diluent, wherein the nonreactive polysiloxane diluent is a cyclosiloxane selected from the group consisting of a diphenyl cyclotrisiloxane (D3), triphenyl cyclotrisiloxane (D3), diphenyl cyclotetrasiloxane (D4), tetraphenyl cyclotetrasiloxane (D4), hexaphenyl cyclotetrasiloxane (D4), diphenyl cyclopentasiloxane (D5), tetraphenyl cyclopentasiloxane (D5), hexaphenyl cyclopentasiloxane (D5), diphenyl cyclohexasiloxane (D6), tetraphenyl cyclohexasiloxane (D6), hexaphenyl cyclohexasiloxane (D6), diphenyl cycloheptasiloxane (D7), tetraphenyl cycloheptasiloxane (D7), and hexaphenyl cycloheptasiloxane (D7). In some embodiments, a cured refractive index-matching polymer gel is provided, wherein the crosslinked polysiloxane has an average molecular weight between crosslinks of at least 15,000, or at least 20,000.

In some embodiments, a cured refractive index-matching gel composition is provided comprising a crosslinked polysiloxane, and a nonreactive polysiloxane diluent, wherein the composition comprises 40% up to about 90% by weight of the nonreactive polysiloxane diluent based on the combined weights of the crosslinked polysiloxane and the nonreactive polysiloxane diluent.

In some embodiments, the polysiloxane composition further comprises one or more additives selected from the group consisting of catalysts, antioxidants, moisture scavengers, antimicrobials, flame retardants, corrosion inhibitors, UV light stabilizers, fungicides, cure inhibitors, tackifiers, and nanoparticles.

In some embodiments, a cured refractive index-matching gel composition is provided comprising amorphous silica particles having mean diameter in the range of from 1 nm to no more than 500 nm.

In some embodiments, a cured refractive index-matching gel composition is provided, wherein the composition exhibits i. a hardness as measured by a texture analyzer is in the range of from 1 g to 525 g;
ii. an ultimate elongation of at least about 100%; and
iii. a refractive index in the range of from 1.31 to 1.60 at 1550 nm by ASTM D-1218.

In some embodiments, a cured refractive index-matching gel composition is provided, wherein the composition exhibits i. a hardness as measured by a texture analyzer is in the range of from 5 to 40 g;

ii. an ultimate elongation of at least about 400%; and iii. a refractive index in the range of from 1.40 to 1.48 at 1550 nm by ASTM D-1218.

A cured refractive index-matching polymer gel composition is provided comprising a crosslinked polymer, and a optionally a nonreactive diluent, wherein the refractive index of the diluent is higher than the refractive index of the crosslinked polymer.

An index-matching gel composition is provided prepared from a composition comprising two parts.

Discrete product applications may require a differing levels of "self-healing" and "self-cleaning" characteristic, depending upon geometry, fiber diameter, gel reservoir geometry, and environment. Our ability to tune these properties by adjusting the Part A to Part B ratio is beneficial.

A cured polysiloxane polymer gel, and an optical fiber alignment system containing a cured polysiloxane gel, is provided comprising a crosslinked polysiloxane polymer, wherein the crosslinked polysiloxane polymer is prepared from a two-part composition comprising a part A and a part B, wherein part A and part B are mixed in a ratio of from 2:1 to 1:2; 1.5:1 to 1:1.5, 1.1:1 to 1:1.1, or 1.05:1 to 1:1.05 of part A:part B; and wherein the cured polysiloxane polymer gel does not exhibit tracking or tear-out of the gel for at least 6, at least 8 or at least 12 cycles after inserting and withdrawing an optical fiber from the cured gel. One of Part A and Part B may contain a divinyl terminated PDMS and a platinum catalyst, and the other may contain a dihydride terminated PDMS and a second reactive component having at least three reactive groups, or at least four reactive groups. The second reactive component may have at least three reactive hydride groups, or at least four reactive hydride groups. One or both of Part A or Part B may contain a non-reactive polysiloxane diluent.

The combined two parts may include a nonreactive diluent comprising a cyclosiloxane and optionally a trimethyl terminated polydimethylsiloxane, an organopolysiloxane comprising a vinyl dimethyl terminated polydimethylsiloxane, a dimethylsiloxane compound comprising at least 3 or at least 4 Si—H hydride functional groups, a Platinum Catalyst; and optionally a cure inhibitor. In some embodiments, the cure inhibitor is 1,3,5,7-Tetravinyltetramethylcyclotetrasiloxane (UCT Specialties T 2160).

In some embodiments, an index-matching gel composition is provided that is prepared from a two part composition, the first part comprising a nonreactive diluent comprising a diphenyl or tetraphenyl cyclosiloxane, a vinyldimethyl terminated polydimethylsiloxane having two vinyl groups, and a platinum catalyst; and the second part comprising a nonreactive diluent comprising a diphenyl or tetraphenyl cyclosiloxane, and a dimethylsiloxane compound dimethylsiloxane compound comprising at least 3 or at least 4 Si—H hydride functional groups.

Discrete product applications may require a differing levels of "self-healing" and "self-cleaning" characteristic, depending upon geometry, fiber diameter, gel reservoir geometry, and environment. The ability to tune these properties by adjusting the Part A to Part B ratio is beneficial. Refractive-index may be adjusted by adding a non-reactive polysiloxane diluent having a higher refractive index than the cured gel without diluent.

In some embodiments, an optical fiber alignment system is provided comprising: an alignment device defining a fiber insertion axis extending between first and second ends of the alignment device, the alignment device also defining a fiber alignment region positioned along the fiber insertion axis; and a cured refractive index-matching gel composition positioned within the fiber alignment region, wherein an optical fiber to be aligned penetrates through the gel, wherein the cured refractive index-matching gel composition comprises a crosslinked polysiloxane, and a nonreactive polysiloxane diluent, wherein the refractive index of the diluent is higher than the refractive index of the crosslinked polysiloxane.

In some embodiments, a method for preparing a crosslinked organopolysiloxane gel is provided which comprises reacting together: 1) a organopolysiloxane containing first reactive groups; and 2) at least one compound containing second reactive groups, wherein said second reactive groups in the compound being capable of reacting with said first reactive groups in the organopolysiloxane; in the presence of a diluent, which is inert to said first and said second reactive groups, in an amount of from at least about 40% by weight to about 95% by weight of the combined weights of said diluent, said organopolysiloxane and said compound, wherein the inert diluent is a cyclopolysiloxane having a refractive index higher than the organopolysiloxane.

BRIEF DESCRIPTION OF THE DRAWINGS

FIG. 7 is another perspective, exploded view of the fiber alignment device of FIG. 1;

FIG. 8 is a cross-sectional view of the fiber alignment device of FIG. 2 taken along the fiber insertion axis;

FIG. 9 is a cross-sectional view of the fiber alignment device of FIG. 2 taken along an axis transverse to the fiber insertion axis;

DETAILED DESCRIPTION

Figure 1:
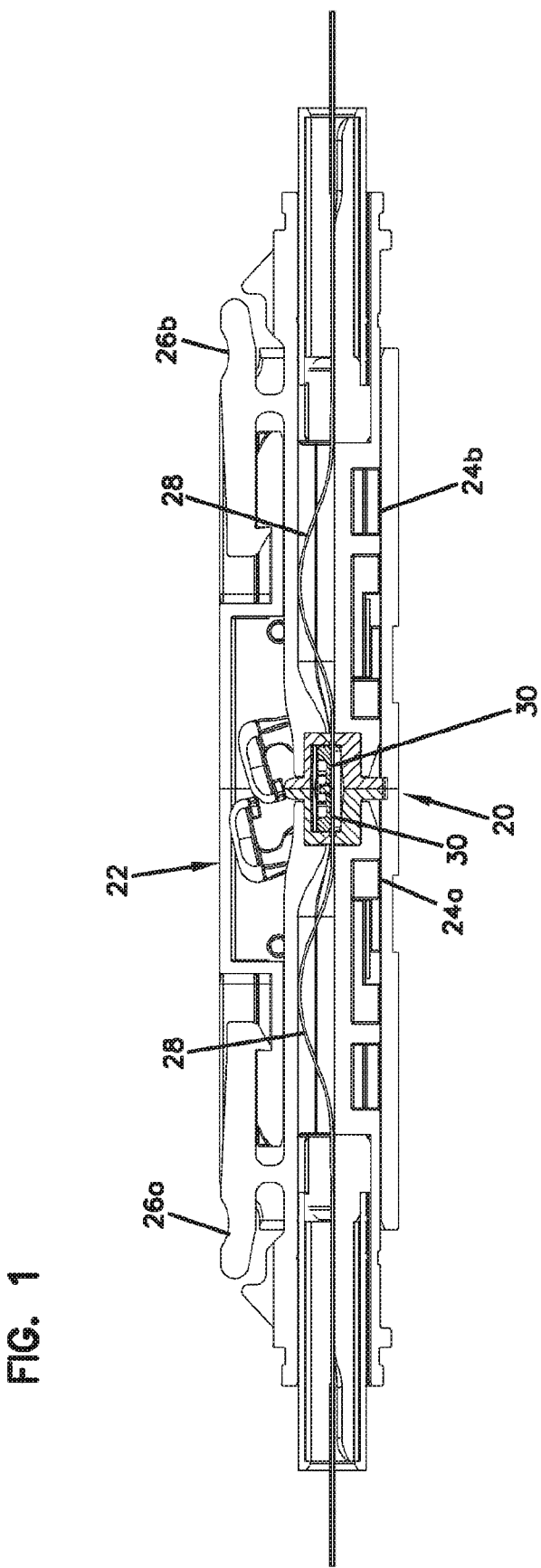
FIG. 1 is a longitudinal, cross-sectional view of a fiber optic adapter incorporating an example fiber alignment device in accordance with the principles of the present disclosure; the fiber optic adapter is shown receiving and optically coupling together two ferrule-less fiber optic connectors.
Figure 2:
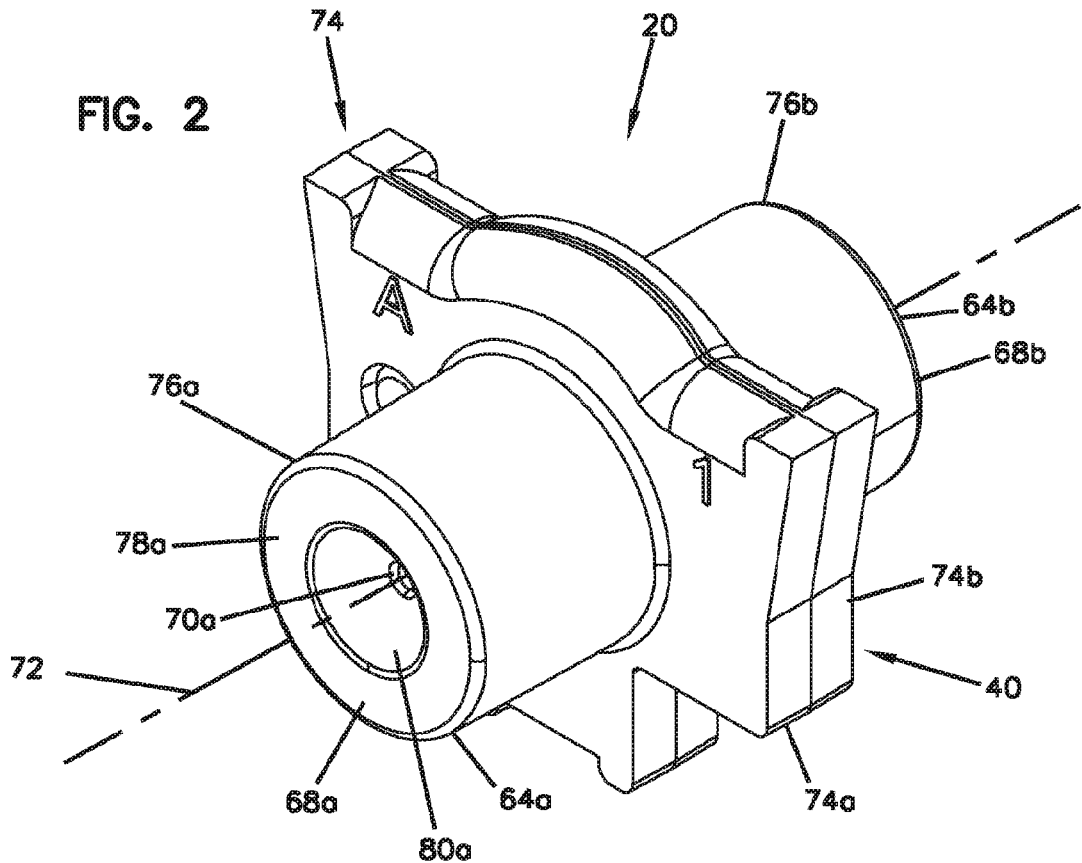
FIG. 2 is a front, top, left side perspective view of the fiber alignment device of FIG. 1.

Various examples will be described in detail with reference to the drawings, wherein like reference numerals represent like parts and assemblies throughout the several views. Any examples set forth in this disclosure are not intended to be limiting and merely set forth some of the many possible ways for implementing the broad inventive aspects disclosed herein. In this description, words such as "upper," "top," "lower," and "bottom" have been used for ease of description to describe the positional relationships of the various features, parts and components. It will be appreciated that such terms are not intended to be construed as limiting. For example, such terms are not intended to mean that a fiber alignment device in accordance with the principles of the present disclosure is required to be used in a particular orientation. For example, in actual use, a feature identified herein as being a top feature can be installed in a bottom orientation and a feature described herein as being a bottom feature could be installed in a top orientation.

All patents, patent applications and publications referred to herein are incorporated by reference in their entirety.

The term "about," as used herein when referring to a measurable value such as an amount of a compound, dose, time, temperature, and the like, is meant to encompass variations of 10%, 5%, 1%, 0.5%, or even 0.1% of the specified amount.

The disclosure is directed to a fiber alignment device for axially aligning and coupling optical fibers such that optical signals can be transferred from one of the optical fibers to the other. Gel of the type described herein can be disposed within the fiber alignment device to aid in optically coupling and/or cleaning the optical fibers. In certain implementations, the optical fibers are supported by ferrule-less optical connectors. The fiber alignment device can include grooves formed in substrates, v-grooves, micro-alignment bores, spring-biased balls, cantilever structures, and/or other alignment mechanisms to axially align the optical fibers.

In some implementations, a fiber alignment device has a front and a rear. The fiber alignment device is configured to receive a single optical fiber at the front and a single optical fiber at the rear. The fiber alignment device axially aligns and optically couples the optical fiber received at the front and the optical fiber received at the rear. In other implementations, the fiber alignment device is configured to receive multiple optical fibers (e.g., a ribbon cable) at the front and multiple fibers at the rear. The fiber alignment device axially aligns and optically couples the plurality of optical fibers received at the front and the plurality of optical fibers received at the rear.

Example ferrule-less connectors suitable for use with the fiber alignment devices disclosed herein are described in U.S. Pat. No. 9,575,263 (hereinafter "the '263 patent"), the disclosure of which is hereby incorporated herein by reference. The '263 patent also discloses example fiber alignment devices suitable for holding the gel described herein. Other suitable fiber alignment devices are disclosed in U.S. application Ser. No. 15/512,301, filed Mar. 17, 2017, and titled "Optical Fiber Connection System Including Optical Fiber Alignment Device;" U.S. Application No. 62/454,439, filed Feb. 3, 2017, and titled "Device for Aligning Optical Fibers;" and U.S. Application No. 62/430,343, filed Dec. 5, 2016, and titled "Multi-Fiber Ferrule-less Duplex Fiber Optic Connectors with Multi-Fiber Alignment Devices," the disclosures of which are hereby incorporated herein by reference.

Figure 10:
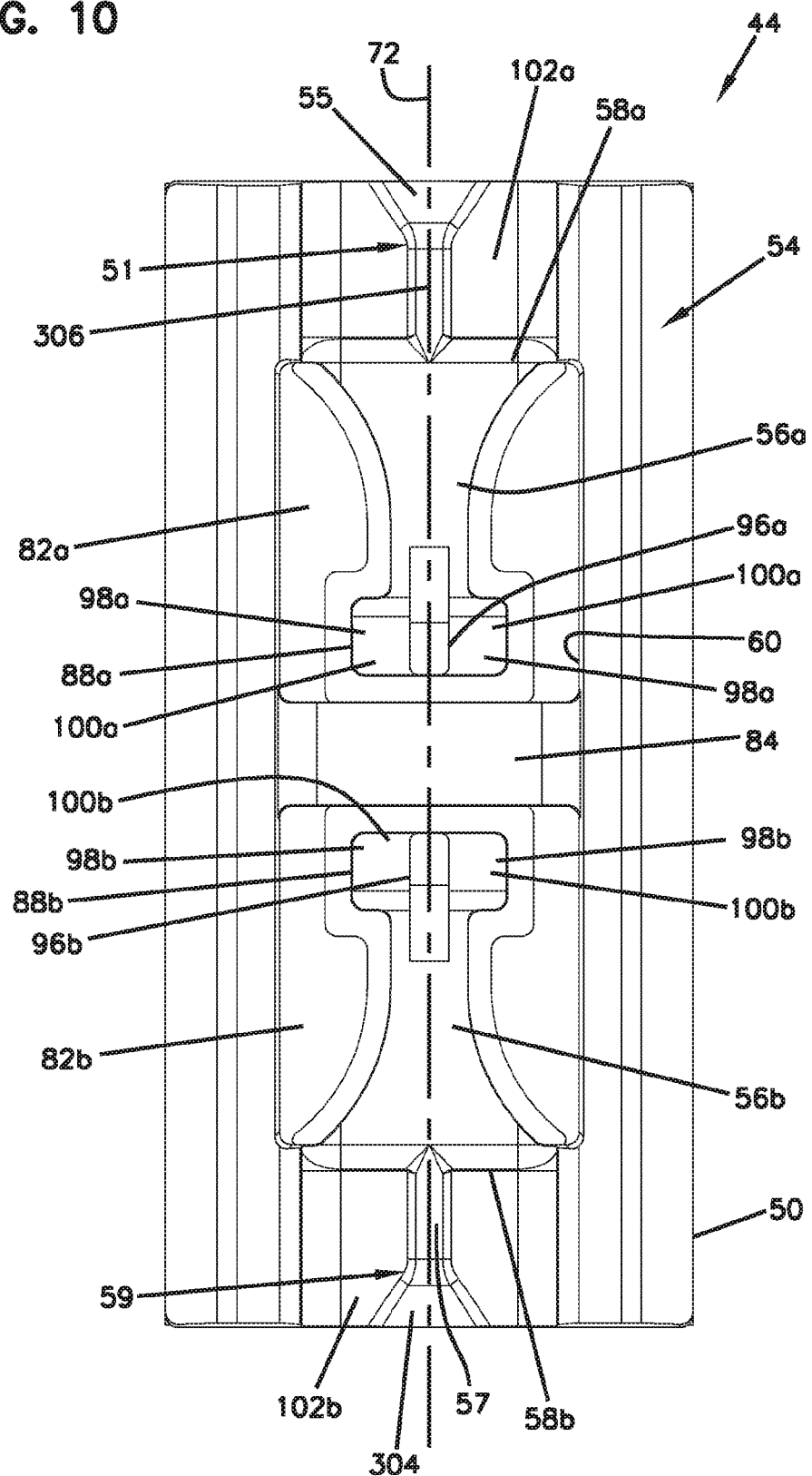
FIG. 10 is a bottom view of an example fiber alignment component of the fiber alignment device of FIG. 4.

Referring to the figures in general, example ferrule-less fiber alignment devices suitable to hold the gel disclosed herein are shown. FIGS. 1-9 illustrate an alignment device suitable for optically coupling together two optical fibers (e.g., two ferrule-less optical connectors). FIG. 10 illustrates an alignment device suitable for optically coupling a plurality of optical fibers to another plurality of optical fibers.

FIGS. 1-9 illustrate a fiber alignment device 20 in accordance with the principles of the present disclosure. The fiber alignment device 20 is adapted for co-axially aligning optical fibers such that the optical fibers are optically coupled so that light can be transferred from one fiber to the other.

While the embodiment disclosed herein is configured to align two optical fibers, it will be appreciated that the various parts and components could be duplicated so as to be applicable to alignment devices for aligning multiple sets of optical fibers.

Additionally, it will be appreciated that fiber alignment devices in accordance with the principles of the present disclosure can be used for aligning optical fibers in a variety of applications. For example, alignment devices in accordance with the principles of the present disclosure can be incorporated within fiber optic adapters that are configured for receiving ferrule-less fiber optic connectors. In such a use, the alignment devices are configured for aligning ferrule-less optical fibers corresponding to the fiber optic connectors when the fiber optic connectors are inserted within ports of the fiber optic adapters. In other examples, fiber alignment devices in accordance with the principles of the present disclosure can be incorporated within connectors such as field-installable connectors to provide optical couplings within the connectors. Moreover, fiber alignment devices in accordance with the principles of the present disclosure can be used at splice trays, or other locations where it is desired to provide mechanical splicing between optical fibers.

FIG. 1 shows the fiber alignment device 20 incorporated within a fiber optic adapter 22. The fiber optic adapter 22 includes adapter ports 24a, 24b for receiving fiber optic connectors such as ferrule-less fiber optic connectors 26a, 26b. The ferrule-less fiber optic connectors 26a, 26b include optical fibers 28 having free-end portions 30 that are not supported by structures such as ferrules (i.e., relatively hard structures which typically support the ends of optical fibers in traditional ferruled connectors such as SC-connectors, LC-connectors, MPO connectors and other types of connectors). In certain examples, the free-end portions 30 are bare fibers which typically include a core surrounded by only a cladding layer. In other examples, the free-end portions 30 may include one or more coatings. As shown at FIG. 1, the ferrule-less fiber optic connectors 26a, 26b are respectively received in the adapter ports 24a, 24b and the free-end portions 30 of their corresponding optical fibers 28 are received within the fiber alignment device 20. The fiber alignment device 20 is centrally located within the fiber optic adapter 22 and receives and coaxially aligns the free-end portions 30 of the ferrule-less fiber optic connectors 26a, 26b when the ferrule-less fiber optic connectors 26a, 26b are inserted within their corresponding adapter ports 24a, 24b.

Referring to FIGS. 4-7, the fiber alignment device 20 includes an outer fiber alignment housing 40 configured to contain a fiber alignment subassembly 42. The fiber alignment subassembly 42 includes a fiber engagement component 44 and a guide feature 46 defining a fiber alignment groove 48 (see FIG. 9). The fiber engagement component 44 can include a plastic or polymeric structure (e.g., a molded plastic part) which can include a main body 50 defining a top side 52 and a bottom side 54 (see FIG. 5).

The fiber engagement component 44 can also include elastic cantilever arms 56a, 56b. In one example, the elastic cantilever arms 56a, 56b are unitarily formed as one piece with the main body 50 of the fiber engagement component 44. For example, the elastic cantilever arms 56a, 56b can include base ends 58a, 58b that are monolithically connected with the main body 50. The bottom side 54 of the main body 50 can define an elongate pocket 60 that is open in a downwardly facing direction. The guide feature 46 can include parallel rods 62a, 62b that fit within the elongate pocket 60 and that cooperate to define the fiber alignment groove 48. When the fiber alignment subassembly 42 is installed within the fiber alignment housing 40, the fiber alignment housing 40 includes structure that forces, compresses or otherwise retains/holds the rods 62a, 62b in the elongate pocket 60 such that the fiber alignment housing 40 assists in positioning and retaining the rods 62a, 62b within the open sided elongate pocket 60.

Referring back to FIGS. 2-3, the fiber alignment housing 40 includes first and second housing pieces 64a, 64b that meet at a central interface plane. In certain examples, the first and second housing pieces 64a, 64b can be half-pieces. The first and second housing pieces 64a, 64b respectively define opposite first and second ends 68a, 68b of the fiber alignment housing 40. The opposite first and second ends 68a, 68b define co-axially aligned first and second fiber insertion openings 70a, 70b that are aligned along a fiber insertion axis 72 that is oriented generally perpendicular relative to the central interface plane 66. The first and second housing pieces 64a, 64b include flange portions 74a, 74b that cooperate to define a central flange 74 of the fiber alignment housing 40. Opposing axial end faces 75a, 75b of the flange portions 74a, 74b mate at the central interface plane 66. The axial end faces of the flange portions 74a, 74b can include male projections 90 that fit within corresponding female receptacles 92.

The first and second housing pieces 64a, 64b also include barrel-portions 76a, 76b that project axially outwardly from the flange portions 74a, 74b along the fiber insertion axis 72. The barrel-portions 76a, 76b include axial end faces 78a, 78b. The fiber insertion openings 70a, 70b are defined through the axial end faces 78a, 78b. The axial end faces 78a, 78b also include transition portions 80a, 80b that surround the fiber insertion openings 70a, 70b. Transition portions 80a, 80b can be configured for guiding or directing optical fibers into the fiber insertion openings 70a, 70b. In certain examples, the transition portions 80a, 80b can be tapered or angled relative to the fiber insertion axis 72. In certain examples, the transition portions 80a, 80b can be funnel-shaped When the fiber alignment device 20 is assembled (see FIGS. 2 and 3), the fiber alignment groove 48 preferably generally aligns with the fiber insertion axis 72 in a coaxial orientation. Additionally, the elastic cantilever arms 56a, 56b of the fiber engagement component 44 having lengths that extend along (e.g., parallel to and above) the fiber alignment groove 48 as well as the fiber insertion axis 72. The elastic cantilever arms 56a, 56b are provided within recesses 82a, 82b defined through the top side 52 of the main body 50 of the fiber engagement component 44. The recesses 82a, 82b as well as the elastic cantilever arms 56a, 56b are separated by an intermediate cross-rib 84 that provides transverse reinforcement to the fiber engagement component 44. The cross-rib 84 is centrally located between opposite ends 86a, 86b of the main body 50 of the fiber engagement component 44. The cantilever arms 56a, 56b include free ends 88a, 88b adjacent the cross-rib 84 and base ends 58a, 58b generally adjacent to the corresponding opposite ends 86a, 86b of the main body 50. Tapered fiber insertion transitions 87a, 87b are provided at the ends 86a, 86b for guiding fibers into the fiber alignment groove 48.

In certain examples, the parallel rods 62a, 62b can be cylindrical. In certain examples, the parallel rods 62a, 62b can have rounded ends. In certain examples, rounded ends can be dome or semi-spherically shaped. In certain examples, the rounded ends can be configured to guide or direct optical fibers into the fiber alignment groove 48.

The fiber alignment subassembly 42 can include features that ensure precise relative positioning between the fiber engagement component 44 and the guide feature 46. In certain examples, the fiber alignment subassembly 42 can have structures that precisely position the rods 62a, 62b relative to the main body 50 of the fiber engagement component 44, and can also include structures that ensure that the free ends 88a, 88b of the elastic cantilever arms 56a, 56b are positioned at a predetermined spacing from the fiber alignment groove 48. The predetermined spacing can be configured such that fibers can be readily received within the fiber alignment groove 48 without experiencing undue resistance from the elastic cantilever arms 56. Simultaneously, the cantilever arms 56 are positioned close enough to the fiber alignment groove 48 to apply sufficient pressure to the optical fibers received within the fiber alignment groove 48 such that the optical fibers are held and retained within the fiber alignment groove 48 in coaxial alignment with one another.

In certain examples, the free ends 88a, 88b of the cantilever arms 56a, 56b can have a preferred configuration that provides the dual function of contacting optical fibers inserted within the fiber alignment groove 48, and contacting the rods 62a, 62b for causing the cantilever arms 56 to flex relative to the main body 50 to a staged position in which a desired spacing is provided between fiber contact regions of the elastic cantilever arms 56 and the fiber alignment groove 48. In certain examples, the free ends 88a, 88b can include central, downwardly projecting tab portions 96a, 96b that align with the fiber alignment groove 48. In certain examples, the tab portions 96a, 96b are positioned directly above the fiber alignment groove 48. In certain examples, the tab portions 96a, 96b project from main bodies of the elastic cantilever arms 56a, 56b so as to project closer to the fiber alignment groove 48 such that a predefined fiber contact spacing is defined by the tab portions 96a, 96b. In certain examples, the tab portions 96a, 96b are the only portions of the cantilever arms 56a, 56b that contact the optical fibers when the optical fibers are within the fiber alignment grooves 48.

The free ends 88a, 88b also include wing portions 98a, 98b that project laterally outwardly from opposite sides of the tab portions 96a, 96b. The wing portions 98a, 98b are elevated or otherwise offset from the tab portions 96a, 96b so that the wing portions 98a, 98b are not adapted to contact the optical fibers within the fiber alignment groove 48. Instead, the wing portions 98a, 98b include reference surfaces 100a, 100b that contact top sides of the rods 62a, 62b (see FIGS. 8 and 9) to cause the elastic cantilever arms 56 to flex relative to the main body 50 of the fiber engagement component 44 to a position where the tab portions 96a, 96b are spaced a predetermined and precisely controlled amount from the fiber alignment groove 48 when the rods 62a, 62b are pressed in the pocket of the main body 50.

The free ends 88a, 88b can be described as having a hammerhead configuration. The wing portions 98a, 98b can rest on the rods 62a, 62b (e.g., the tops of the rods) prior to insertion of the optical fibers along the fiber insertion axis 72. The rods can be sized such that the optical fibers are level or almost exactly level with the tops of the rods (horizontal tangent to the tops of the fibers are tangent with the tops of the rods). The size (e.g., projection depth) of the tab portions 76a, 76b control the amount of friction/interference generated as the fibers are inserted along the alignment groove. By varying the size of the rods and/or the depth the tabs portions 76a, 76b project, the amount of interference during insertion of the optical fibers into the alignment device and thus the required insertion force can be varied/controlled.

The fiber alignment subassembly 42 also includes structure for ensuring that the guide feature 46, such as the rod 62a, 62b, are positioned at a precise location relative to the main body 50 of the fiber engagement component 44. In one example, the main body 50 of the fiber engagement component 44 can include a reference surface arrangement within the elongate pocket including reference surfaces 102a, 102b (see FIG. 8) against which the rods 62a, 62b are pressed when the fiber alignment subassembly 42 is loaded within the fiber alignment housing 40.

In certain examples, the reference surfaces 102a, 102b are located generally adjacent the base ends 58a, 58b of the elastic cantilever arms 56a, 56b. In certain examples, the reference surfaces 102a, 102b engage top portions of the rods 62a, 62b when the rods are pressed into the pocket by the housing 40. In certain examples, the reference surfaces 102a, 102b engage first portions of the top sides of the parallel rods 62a, 62b and the reference surfaces 100a, 100b of the wing portions 98a, 98b engage second portions of the top sides of the parallel rods 62a, 62b. In certain examples, reference surfaces 100a, 100b and the reference surfaces 102a, 102b engage the same sides of the rods 62a, 62b (e.g., the reference surfaces all engage the top sides of the rods 62a, 62b). In this way, the reference surfaces 100a, 100b, and the reference surfaces 102a, 102b cooperate to ensure that the tab portions 96a, 96b of the cantilever arms 56a, 56b are positioned at a desired spacing relative to the fiber alignment groove 48. The reference surfaces 102a, 102b establish precise positioning between the main body 50 of the fiber engagement component 44 and the parallel rods 62a, 62b; and the reference surfaces 100a, 100b establish precise positioning between the tab portions 96a, 96b of the cantilever arms 56a, 56b and the rods 62a, 62b.

The reference surfaces 102a, 102b are part of the main body 50 of the fiber engagement component 44 and are preferably mechanically decoupled (mechanically isolated) from the cantilever arms 56a, 56b. Thus, contact and loading between the rods 62a, 62b and the reference surfaces 102a, 102b does not cause the cantilever arms 56a, 56b to deflect. In one example, the reference surfaces 102a, 102b can be raised (e.g., stepped-up, upwardly offset, elevated, etc.) relative to tops sides of the cantilever arms 56a, 56b.

It will be appreciated that the fiber alignment housing 40 defines an internal chamber 99 or cavity for receiving the fiber alignment subassembly 42. Additionally, the fiber alignment housing 40 includes internal features adapted to engage the fiber alignment subassembly 42 to effectively position or center the fiber alignment subassembly 42 within the fiber alignment housing 40. Preferably, the fiber alignment subassembly 42 is centered within the fiber alignment housing 40 such that the fiber alignment groove 48 coaxially aligns with the fiber insertion axis 72. In certain examples, the fiber alignment housing 40 includes side rails 104 that engage opposite sides of the fiber engagement component 44 to laterally center the fiber alignment subassembly 42. In certain examples, the side rails 104 include a pair of opposing side rails 104a defined by the first housing piece 64a and a pair of opposing side rails 104b defined by the second housing piece 64b.

The fiber alignment housing 40 can also include internal structure for vertically centering the fiber alignment subassembly 42 within the fiber alignment housing 40. The internal structure can include an upper subassembly positioning surface arrangement 106 and a lower subassembly positioning surface arrangement 108 between which the fiber alignment subassembly 42 is vertically compressed. In certain examples, the upper subassembly positioning surface arrangement 106 can engage the top side 52 of the main body 50 of the fiber engagement component 44 and the lower subassembly positioning surface arrangement 108 can engage the bottom sides of the rods 62a, 62b. In this way, the rods 62a, 62b can be compressed by the lower subassembly positioning surface arrangement 108 into the elongate pocket 60. In certain examples, the lower subassembly positioning surface arrangement 108 includes surfaces 108a, 108b positioned adjacent opposite ends of the rods 62a, 62b. In certain examples, surfaces 108a can be defined by the first housing piece 64a and surfaces 108b can be defined by the second housing piece 64b. The rods 62a, 62b can extend through a majority of the axial length of the fiber alignment housing 40. In certain examples, the lower subassembly positioning surfaces 108a, 108b can generally align with and oppose the reference surfaces 102a, 102b. In certain examples, the lower subassembly positioning surfaces 108a, 108b can be positioned adjacent to the fiber insertion openings 70a, 70b, respectively. In certain examples, the upper subassembly positioning surface arrangement 106 can include surfaces 106a, 106b defined by corresponding rails 107a, 107b.

In certain examples, the lower subassembly positioning surfaces 108a, 108b can be defined by corresponding tee-beams 110a, 110b. The tee-beam 110a corresponds to the first housing piece 64a and the tee-beam 110b corresponds to the second housing piece 64b. The tee-beams 110 have tee-shaped cross-sections defined by webs 112 and flanges 114. The flanges 114 are transversely oriented relative to the webs 112 and include flange portions 116, 118 that project outwardly from the webs 112. The flanges 114 include end faces 120 that oppose the bottom sides of the rods 62a, 62b. Portions of the end faces 120 define the lower subassembly positioning surfaces 108a, 108b. Flange portions 116 are adapted to engage the rod 62a and flange portions 118 are adapted to engage the rod 62b. Space beneath the flange portions 116, 118 allow the flange portions 116, 118 to flex slightly upon contact with the rods 62a, 62b when the rods 62a, 62b are compressed against the reference surfaces 102a, 102b of the main body 50 of the fiber engagement component 44. The end faces 120 also include angled non-contact sections 122 that angle away from the rods 62a, 62b as the angled portions extend away from their corresponding fiber insertion openings 70a, 70b and toward the central interface plane 66. Thus, contact between the positioning surfaces 108a, 108b of the alignment housing 40 and the bottom sides of the rods 62a, 62b is eliminated at the middle portion (e.g., at the central interface plane 66) of the alignment housing 40. This can prevent bulging at the middle portion. Additionally, within the pocket of the main body 50 at the middle portion, the side walls of the pocket are notched (e.g., recessed) at recessed regions 53 to prevent lateral contact between the rods 62a, 62b and the main body 50 to inhibit bulging of the main body at the middle portion.

When the fiber alignment device 20 is assembled, the fiber engagement component 44 is compressed between the upper subassembly positioning surfaces 106a, 106b and the first and second rods 62a, 62b. Also, the first and second rods 62a, 62b are compressed between the lower subassembly positioning surfaces 108a, 108b and the reference surfaces 102a, 102b of the fiber engagement component 44. The fiber engagement component 44 and the first and second rods 62a, 62b are compressed together between the upper and lower subassembly positioning surfaces 106, 108.

In certain examples, the main body 50 includes fiber insertion lead-in structures 51, 59 at opposite ends of the main body 50. The lead-in structures 51, 59 can extend through the reference surfaces 102a, 102b (e.g., see FIG. 10). The lead-in structures 51, 59 can be axially aligned with the fiber insertion axis 72, the fiber alignment groove 48, the transition portions 80a, 80b of the alignment housing 40 and the tab portions 96a, 96b of the cantilever arms 56a, 56b. Each of the lead-in structures 51, 59 includes a tapered section 55 (e.g., a partial funnel, partial cone, etc.) that leads into a non-tapered groove section 57.

Figure 11:
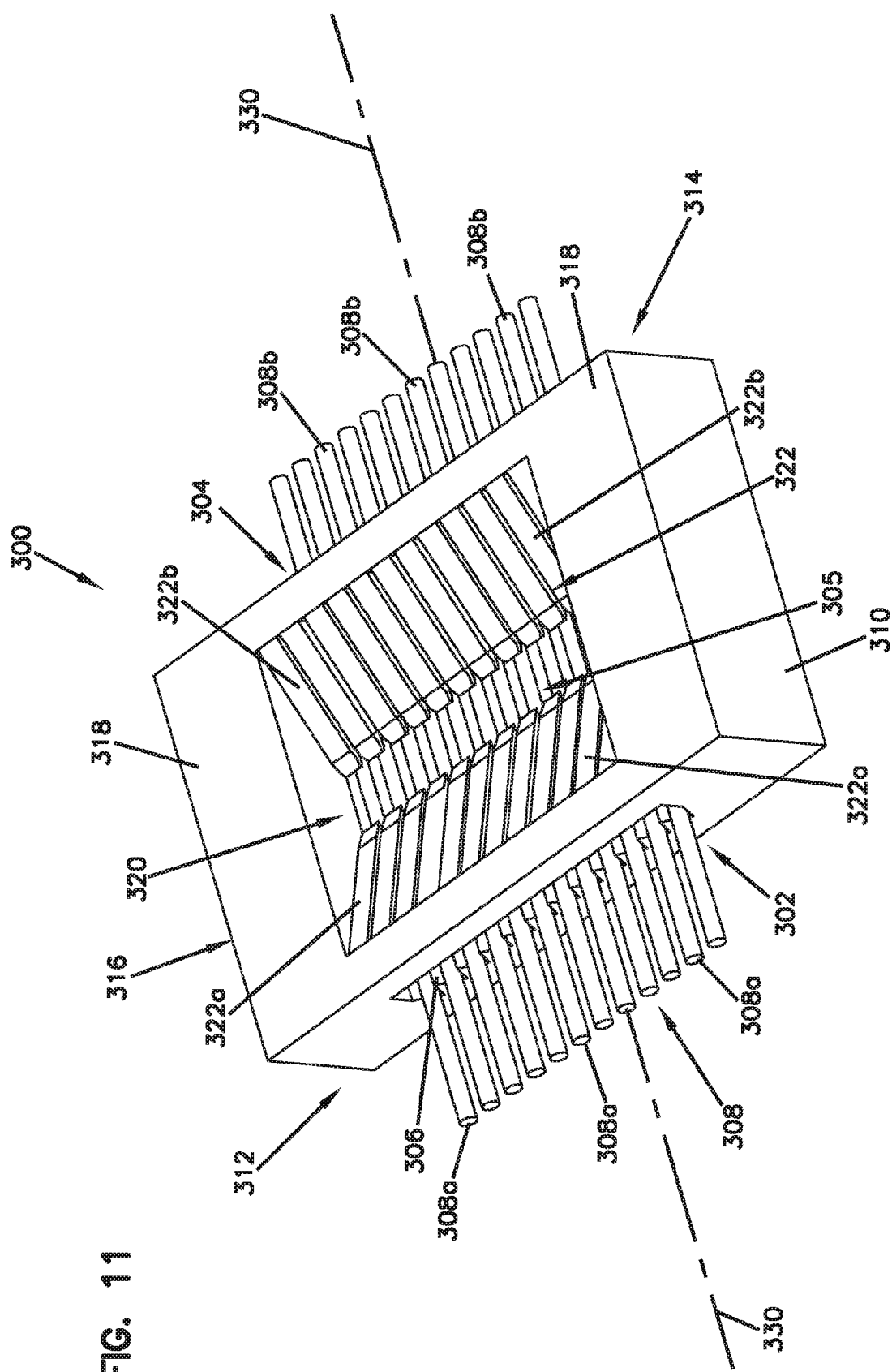
FIG. 11 is a perspective view of another fiber alignment device in accordance with the principles of the present disclosure; the fiber alignment device is shown receiving and optically coupling together two groups of optical fibers.
Figure 12:
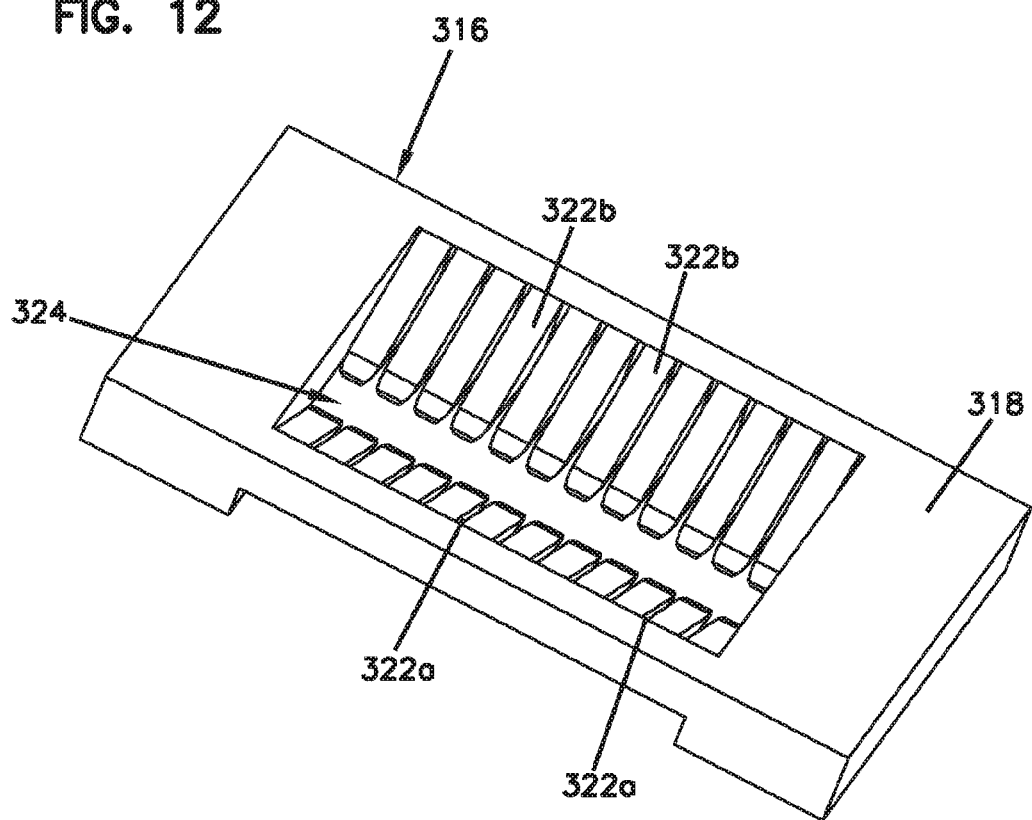
FIG. 12 is a top view of a top portion of the self-centering device of FIG. 11.
Figure 13:
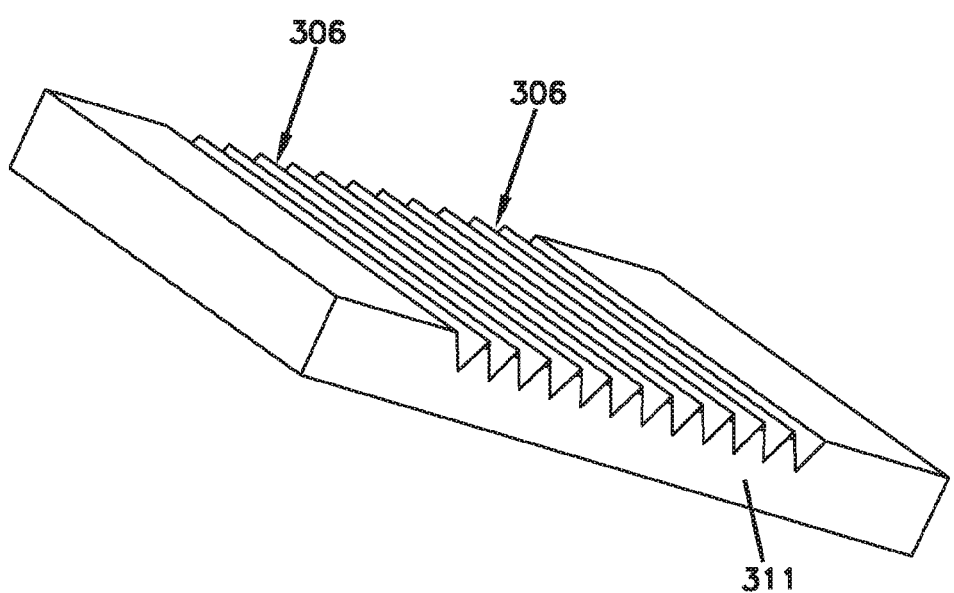
FIG. 13 is a top view of a bottom portion of the self-centering device of FIG. 11.

FIGS. 11-13 show an example fiber alignment device 300 in accordance with a fiber ribbon alignment construction or system to align fibers from ferrule-less connector plugs or other structures. In one example, a fiber optic ribbon cable may include a plurality of optical fibers 308. Each of the plurality of optical fibers 308 includes a fiber axis 330 and each of the plurality of optical fibers 308 includes a bare optical fiber and a coating surrounding the bare optical fiber to form an external surface of the optical fiber.

The fiber alignment device 300 can be made from molded materials. The fiber alignment device 300 includes a body 310 having a first end 312, a second end 314, a top 316 (FIG. 12) and a bottom 311 (FIG. 13). The first end 312 defines a first opening 303 and the second end 314 defines an opposite second opening 304. The first and second openings 303, 304 each provide for optical fibers 308 to be centered and oriented in the bottom 311 of the fiber alignment device 300. The bottom 311 has a plurality of groove structures 306 integrally formed, such as a V-grooves, or gaps, or slots. It will be appreciated that the groove structures 306 can include other groove profiles using various materials and manufacturing processes.

Each of the plurality of optical fibers 308 may be inserted through the bottom 311 of the first and second openings 303, 304 such that the fibers are disposed within the groove structures 306 in a substantially uniform orientation to facilitate centering and alignment of a first plurality of optical fiber 308a with a second plurality of optical fiber 308b. In this manner, as a non-limiting example, the fiber alignment device 300 provides an alignment of the first plurality of optical fibers 308a in the first opening 303 to the second plurality of optical fibers 308b in the second opening 304.

The top 316 of the body 310 of the fiber alignment device 300 comprises a planar region 318. The planar region 318 contains a recess 320 including a plurality of cantilever members 322. The cantilever members 322 are arranged and configured on opposite sides of a fiber alignment region 305. The fiber alignment region 305 can help to facilitate centering and alignment of the optical fibers 308 with another optical fiber 308.

In one example, the plurality of cantilever members 322 extend from the planar region 318 and project at least partially downward at an angle toward the optical fibers 308. It will be appreciated that the plurality of cantilever members 322 may be configured to press the optical fibers in the grooves without being angled down. For example, a cantilever member may include a bump (e.g., projection) that extends from the body of the cantilever to engage the fibers and press the fibers into a respective groove.

In one example, a first set of cantilever members 322a are flexible and configured for urging each of the first plurality of optical fibers 308a into their respective groove structures 306 and a second set of cantilever members 322b are flexible and configured for urging each of the second plurality of optical fibers 308b into their respective groove structures 306. In other words, the first and second sets of cantilever members 322a, 322b respectively align the first and second plurality of optical fibers 308a, 308b to one another.

As described above, a gel can be disposed within any fiber alignment devices disclosed herein.

Refractive-index matching, self-curing and self-cleaning gel compositions and articles containing said compositions are provided that are particularly suited for environmentally protecting substrates, especially optical fiber interfaces, which accomplish the previously recited objects and retain the desired features recited previously while providing additional benefits readily apparent to the skilled artisan from the following more detailed description.

It is one objective that the gel compositions exhibit superior and useful combinations of tensile strength, elongation, toughness, index matching, accepting high levels of diluent without significant syneresis, particularly while under compression while maintaining beneficial tack properties essential for self-curing and self-cleaning gel compositions.

In another objective, index-matching, self-healing and self-cleaning gel compositions are provided for reduce signal loss or reflection within the optical fiber networks and protect the optical interface from the environment, sealing and encapsulating optical fiber interfaces and articles used to protect said optical fiber interfaces are therefore subjected to temperatures in the range from about −40° to about 60° or even 70° C., to insect damage, to water (both liquid and vapor) and must have means to enable the technician to reenter the box and alter or repair contacts, connections, splices and optical fibers contained therein.

In a further objective, index-matching, self-healing, self-cleaning gels are provided for use in sealing connectors and adapters used in joining optical fibers. More specifically, in one aspect this invention provides a cured organopolysiloxane gel which contains crosslinks and unreacted crosslinkable sites, the density of the crosslinks being C (crosslinks per gram) and the density of the unreacted crosslinkable sites being V (sites per gram) and V being less than about twelve fifths preferably less than about nine fifths of C.

The term crosslink in this specification connotes a covalent bond formed by chemical reaction between two crosslinkable sites from which sites depend a total of three or more molecular segments; or at least two covalent bonds, each formed by chemical reaction between two crosslinkable sites, attaching a chemical moiety to at least two polymer chains such that the chemical moiety has at least three molecular segments depending therefrom. Typically the chemical moiety is the residue of a low molecular weight compound or a low molecular weight oligomeric material containing at least three crosslinkable sites. Specifically, the term crosslink contemplates both trifunctional (T-links) (that is crosslinks having three molecular segments depending therefrom) tetrafunctional (H-links) (that is crosslinks having four molecular segments depending therefrom) and higher functionality crosslinks.

In one embodiment, a method is provided for preparing a crosslinked organopolysiloxane gel which comprises reacting together: 1) a organopolysiloxane containing first reactive groups; and 2) at least one compound containing second reactive groups; said second reactive groups in the compound being capable of reacting with said first reactive groups in the organopolysiloxane; in the presence of a diluent, which is inert to said first and said second reactive groups, in an amount of from at least about 40% by weight to about 95% by weight of the combined weights of said diluent, said organopolysiloxane and said compound. In some embodiments, the inert diluent is a cyclopolysiloxane having a refractive index higher than the organopolysiloxane.

Preferably in this and the following aspect the organopolysiloxane contains an average of at least Y first reactive groups per molecule where Y is at least 2, the at least one compound contains an average of at least W second reactive groups where W is at least 2, and the sum of Y and W is at least about 5.

In another aspect, this disclosure provides a kit comprising a first and a second container, each of said containers comprising at least one material selected from: (1) an organopolysiloxane containing first reactive groups) and 2) a compound containing second reactive groups; and said second reactive groups in the compound being capable of reacting with said first reactive groups in the organopolysiloxane; and 3) a diluent, which is inert to reaction with said first and said second reactive groups, in an amount of from at least about 40% by weight to about 95% by weight of the combined weights of said diluent, said organopolysiloxane and said compound; the division of materials between said first and said second container, which are separate, being such that said organopolysiloxane and said compound are stable when said first and said second container are maintained at room temperature under storage conditions for 6 months. In some embodiments, the inert diluent is a cyclopolysiloxane having a refractive index higher than the organopolysiloxane.

In a further aspect, the present disclosure provides organopolysiloxane gel compositions selected from the group consisting of: a composition having hardness values as measured by a texture analyzer of from 1 to 50 g with an ultimate elongation of at least about 500% for example at least about 700%, yet more preferably at least about 1000%, for example at least about 1100%, a composition having hardness as measured by a texture analyzer of from 5 to 40 g with an ultimate elongation of at least about 600% for example at least about 650%, yet more preferably at least about 750%, for example at least about 900%, most preferably at least about 1000%, a composition having hardness values as measured by a texture analyzer of from 10 to 20 g with an ultimate elongation of at least about 400% for example at least about 450%, yet more preferably at least about 500%, for example at least about 550%, most preferably at least about 600%, a composition having hardness as measured by a texture analyzer of from 1 to 15 g with an ultimate elongation of at least about 250% for example at least about 275%, yet more preferably at least about 325%, for example at least about 375%, most preferably at least about 425%, or mixtures thereof.

As used herein, "gel" refers to the category of materials which are solids extended by a fluid extender. The gel may be a substantially dilute system that exhibits no steady state flow. As discussed in Ferry, "Viscoelastic Properties of Polymers," third ed. P. 529 (J. Wiley & Sons, New York 1980), a polymer gel may be a cross-linked solution whether linked by chemical bonds or crystallites or some other kind of junction. The absence of the steady state flow may be considered to be the definition of the solid-like properties while the substantial dilution may be necessary to give the relatively low modulus of gels. The solid nature may be achieved by a continuous network structure formed in the material generally through crosslinking the polymer chains through some kind of junction or the creation of domains of associated substituents of various branch chains of the polymer. The crosslinking can be either physical or chemical as long as the crosslink sites may be sustained at the use conditions of the gel.

The index-matching gel may be substantially volumetrically incompressible. By being substantially volumetrically incompressible, the index-matching gel exhibits hydraulic characteristics similar to or the same as a liquid when placed under pressure The index-matching gel composition may include a crosslinked gel and diluent that exhibits good index match to the glass fiber, high optical clarity, and low absorption loss.

Gels for use in this disclosure may be silicone (organopolysiloxane) gels, such as the fluid-extended systems taught at U.S. Pat. No. 4,634,207 to Debbaut (hereinafter "Debbaut '207"); U.S. Pat. No. 4,680,233 to Camin et al.; U.S. Pat. No. 4,777,063 to Dubrow et al.; and U.S. Pat. No. 5,079,300 to Dubrow et al., the disclosures of each of which are hereby incorporated herein by reference in their entirety. These fluid-extended silicone gels may be created with nonreactive fluid extenders as in the previously recited patents or with an excess of a reactive liquid, e.g., a vinyl-rich silicone fluid, such that it acts like an extender, as exemplified by the Sylgarde 200 product commercially available from Dow-Corning of Midland, Mich. or as disclosed at U.S. Pat. No. 3,020,260 to Nelson. Because curing is generally involved in the preparation of these gels, they are sometimes referred to as thermosetting gels. The gel may be a silicone gel produced from a mixture of divinyl terminated polydimethylsiloxane, tetrakis (dimethylsiloxy)silane, a platinum divinyltetramethyldisiloxane complex, commercially available from United Chemical Technologies, Inc. of Bristol, Pa., polydimethylsiloxane, and/or 1,3,5,7-tetravinyltetra-methylcyclotetrasiloxane (reaction inhibitor for providing adequate pot life).

Examples of vinyl terminated polysiloxanes appear in U.S. Pat. No. 4,196,273 to Imai et al. Vinyl terminated polysiloxanes may be crosslinked with themselves or with other polysiloxanes containing various functional groups such as aryl, aliphatic (saturated or unsaturated), and fluoroaliphatic moieties (such as CF3 CH2-) or containing other groups such as nitrogen groups, sulphur groups and the like. Examples of such organopolysiloxanes are shown in U.S. Pat. No. 3,624,022 to Ross, U.S. Pat. No. 4,064,027 to Gant, U.S. Pat. No. 4,163,081 to Schulz and U.S. Pat. No. 3,445,420 to Kookootuedes. Diorganopolysiloxanes terminated at the chain ends with two or three vinyl groups have been crosslinked to provide elastomeric or rubber-type products, as shown in U.S. Pat. No. 4,364,809 to Sato et al.

An additional aspect of this invention provides articles for protecting substrates, said articles comprising cured organopolysiloxane gel which contains crosslinks and unreacted crosslinkable sites, the density of the crosslinks being C (crosslinks per gram) and the density of unreacted crosslinkable sites being V (sites per gram) wherein V is less than about twelve fifths, preferably less than nine fifths of C (crosslinks per gram).

Still another aspect of this invention comprises a substrate protectively encapsulated at least in part by a cured organopolysiloxane gel which contains crosslinks and unreacted crosslinkable sites, the density of the crosslinks being C (crosslinks per gram) and the density of unreacted crosslinkable sites being V (sites per gram) wherein V is less than about twelve fifths, preferably less than about nine fifths of C (crosslinks per gram). A still further aspect of this invention provides a method for protecting a substrate comprising: (1) providing a cured organopolysiloxane gel which contains crosslinks and unreacted crosslinkable sites, the density of the crosslinks being C (crosslinks per gram) and the density of unreacted crosslinkable sites being V (sites per gram) wherein V is less than about twelve fifths, preferably less than about nine fifths of C (crosslinks per gram), (2) applying said cured organopolysiloxane gel to said substrate such that said composition substantially encapsulates at least a portion of said substrate.

A further additional aspect of this invention provides a method for protecting a substrate comprising: (1) providing a first means comprising a cured organopolysiloxane gel which contains crosslinks and unreacted crosslinkable sites, the density of the crosslinks being C (crosslinks per gram) and the density of unreacted crosslinkable sites being V (sites per gram) wherein V is less than about twelve fifths preferably less than about nine fifths of C (crosslinks per gram), (2) applying a force means for acting on said first means so that said cured organopolysiloxane gel is maintained in compressive contact with said substrate and substantially encapsulates at least a portion of said substrate.

Thus it is highly desirable that cured gels useful in these and similar applications possess excellent physical properties, including matching refractive index to about that of an optical fiber, high elasticity, self-cleaning, self-curing, and elongation to provide high deformability; high toughness (a combination of high elongation and tensile strength), a cohesive strength greater than its adhesive strength and greater adhesion to the apparatus containing it than to the substrate to ensure the gel remains substantially within the apparatus when it is removed; excellent tack, adhesive properties, resistance to stress relaxation and low compression set to prevent water ingress along the interface between the gel and the bare optical fibers or connector; good stability to syneresis under compression (as hereinbelow described) to prevent shrinkage of the gel and contamination of its environment; high hydrolytic, thermal stability; that it be moisture insensitive and that it possess excellent resistance to the damaging effects of ultra-violet (u. v.) light to enable it to survive exposure to the elements for the long service life contemplated for such devices.

The index-matching gel may be prepared from a base gel composition comprising one or more polysiloxanes, also known as silicones. The polysiloxane or silicone fluids may be reactive silicone polymers formulated with dialkyl and/or diaryl silicone polymers. In some embodiments, the silicone polymers include dimethyl, methylphenyl, diphenyl, and/or trifluoropropylmethyl constituent groups, with refractive index ranging from about 1.38 to about 1.60, about 1.38 to about 1.57, or about 1.39 to about 1.42 when measured at a wavelength selected from 402 nm, 589.3 nm, 633 nm, 980 nm, or 1550 nm according to ASTM D-1218.

Silicone curing gels may contain reactive silicone polymers and reactive silicone crosslinkers in a two-part system. When mixed together these materials are designed to have a very soft and compliant feel when cured and will stick to substrates without migrating. Viscosities can be adjusted with the molecular weight of the polymers from 200-10,000 cP. Depending on the functionality of the polymer, optical index matching can be formulated in the range of 1.38-1.57 by ASTM D-1218. These two-part systems contain reactive polymers and crosslinkers that cure up to a rubbery type hardness. Most will cure at room temperature, however some need heat to cure. To impart increased physical properties, typically these materials have higher viscosities. These materials' viscosity may depends largely on molecular weight of the polymer and steric hindrance of functional groups on the polymer chain and can range from 100 cP (a light oil) to an extremely thick gum polymer.

In some embodiments, the combined weights of organopolysiloxane and compound used to prepare cured organopolysiloxane gel is from about 5 to about 60% of the combined weights of diluent, organopolysiloxane and compound.

In some embodiments, the average molecular weight between crosslinks (Mc) of the cured organopolysiloxane gel is at least about 15,000, more preferably at least about 20,000, for example at least about 40,000, yet more preferably at least about 60,000, for example at least about 100,000, most preferable at least about 150,000 for example at least about 200,000.

In some embodiments, the organopolysiloxane has been cured in the presence of a diluent inert under the conditions used to cure the organopolysiloxane in an amount of from about 40 to about 95% by weight of the combined weights of said organopolysiloxane and said diluent.

In some embodiments, the organopolysiloxane has been cured from a 2 part composition, wherein the combined part 1 and part 2 may contain 1) diluent comprising a nonreactive cyclosiloxane, such as a diphenyl or tetraphenyl cyclosiloxane and/or a trimethyl terminated polydimethylsiloxane, and optionally a monofunctional diluent such as a monovinyl terminated polydimethylsiloxane, 2) organopolysiloxane, such as a vinyldimethyl terminated polydimethylsiloxane;

3) a compound having at least 3 or at least 4 functional Si—H groups such as phenyl Tris(dimethylsiloxy)silane or Tetrakis(dimethylsiloxy)silane;

4) a platinum catalyst; and/or 5) optionally a cure inhibitor.

In some embodiments, the organopolysiloxane has been cured from a 2 part composition, wherein the combined part 1 and part 2 may contain 1) an organopolysiloxane, such as a vinyl-terminated polydimethylsiloxane;

2) a compound having at least 3 or at least 4 functional Si—H groups such as phenyl Tris(dimethylsiloxy)silane or Tetrakis(dimethylsiloxy)silane;

3) a platinum catalyst; and 4) optionally a cure inhibitor.

In some embodiments, the gel composition has a hardness as measured by a texture analyzer of about 1 to 50 g with an ultimate elongation of at least about 250%, more preferably a hardness as measured by a texture analyzer of about 2 to about 40 g, most preferably about 5 to about 30 g, and more preferably has an ultimate elongation of at least about 650%, for example, at least about 700%, yet more preferably at least about 800%.

In some embodiments, cured gel compositions are provided that are moisture insensitive. Preferably also the cured organopolysiloxane gel compositions of the invention contain minimum amounts of ionic species as particulate sodium borate, for example less than about 1800 ppm of the weight of the composition as particulate sodium borate, more preferably less than about 1500 ppm of the weight of the composition as particulate sodium borate. Most preferably the compositions are substantially free of particulate sodium borate.

The term substantially free of particulate sodium borate when applied to curable compositions and curing or cured organopolysiloxane gels of the invention connotes that the said compositions or gels are free of added particulate sodium borate as a discrete chemical entity. This term is not intended to exclude materials, such as sodium borate containing essentially water insoluble glasses, which contain the elements of sodium borate, but not in a discrete chemical form.

In one embodiment, a crosslinked organopolysiloxane is provided which has been crosslinked in the presence of from about 40 to about 95% by weight of a diluent (based on the combined weights of said crosslinked organopolysiloxane plus said diluent), said diluent being inert under the conditions used to crosslink the organopolysiloxane In another embodiment, a cured organopolysiloxane gel is provided comprising from about 40% up to about 95% by weight of a diluent (based on the combined weights of the organopolysiloxane and the diluent), which diluent is inert under the curing conditions used to crosslink said organopolysiloxane and said organopolysiloxane having been crosslinked in the presence of said diluent.

The term unreacted crosslinkable sites connotes reactive sites initially present in the reaction mixture used to prepare cured organopolysiloxane gel which by virtue of stoichiometric imbalance or other reason survive the curing process without producing crosslinks or causing chain extension. As pointed out above, the average density of unreacted crosslinkable sites in the cured organopolysiloxane gel is less than about twelve fifths preferably nine fifths of C.

In some embodiments, if the crosslinks have an average functionality of F where F is at least 3, the ratio of the average molecular weight between cross-links to (F-1) is at least about 7,000. Preferably also, the ratio of the average distance between crosslinks to (F-1) when the organosiloxane chains are fully extended is at least about 250 Angstrom units.

In some embodiments, each molecular segment of organopolysiloxane between reacted first reactive groups is at least 250 Angstrom units long when the molecular chains are fully extended. Generally the density of reactive crosslinkable sites in the cured composition is less than about twelve fifths of C, preferably less than about nine fifths of C; and in some embodiments the density of reactive crosslinkable sites is more preferably less than about three halves of C, for example, less than about six fifths of C, most preferably less than about four fifths of C, for example less than about three fifths of C. We have found that even when 1:1 stoichiometric ratios of compound to organopolysiloxane are used, frequently not all the reactive sites react to form crosslinks. Although we do not want to be limited to any particular explanation, this may occur because some of the reactive sites become entrapped in the crosslinked gel or are by other means prevented from reaction.

In some embodiments, the average molecular weight between crosslinks (that is, the average molecular weight of all molecular segments which are part of the closed loop three dimensional network) in the cured organopolysiloxane gel is at least about $1300/(1-s)^2$ where s is the diluent fraction of the cured organopolysiloxane gel. More preferably, M in the cured organopolysiloxane gel is at least about $1900/(1-s)^2$, most preferably at least about $2600/(1-s)^2$.

In some embodiments, the molar equivalent ratio of the compound or combination of compounds to the organopolysiloxane is such that a majority of the molecules of reactants are joined to one or more other molecules by at least two crosslinks (that is form closed loops which comprise at least part of a three dimensional network). More preferably in these embodiments at least about 50%, for example at least about 65%, preferably at least about 75% of the crosslinks form such closed loops.

In some embodiments, the crosslinkable site is a reactive site capable of reacting with another reactive site to produce either chain extension or crosslinking. By chain extension is meant the reaction of an organopolysiloxane having at least 2 first reactive groups with a compound having 2 second reactive groups such that the molecular weight of the organopolysiloxane is increased without necessary formation of crosslinks. The term cured organopolysiloxane gel' connotes that the organopoly-siloxane has been maintained under curing conditions at a curing temperature for a sufficient time that the hardness as measured by a texture analyzer of said gel is not significantly increased if the curing time is doubled.

In some embodiments, a method is provided comprising reacting one or more compounds having at least three second reactive groups and at least one compound having two second reactive groups with the first reactive groups of the organopolysiloxane and of forming covalent bonds thereto. In this embodiment of the invention it is not preferred that the selected organopolysiloxane have a ratio of the weight average molecular weight to Y of at least 7000. It is preferred that the relative amounts of the compound having only 2 reactive groups per molecule and the organopolysiloxane be such that if said compound is reacted with said organopolysiloxane alone, the resultant organopolysiloxane would have a ratio of the weight average molecular weight to the average number of first reactive groups per molecule of at least 7000.

In certain embodiments, each reactive site in said organopolysiloxane and said compound is independently selected from the group consisting of vinyl, hydroxy, acyloxy, amine, oxime and alkoxy groups and hydrogen and halogen, for example chlorine, directly bonded to silicon, with the proviso that the ratio of silicon bonded hydrogens to unsaturated aliphatic groups, if both are present in the composition, is from about 0.67 to about 1.5.

In some embodiments, the organopolysiloxane has a weight average molecular weight of at least 14,000 and is selected from one or more of

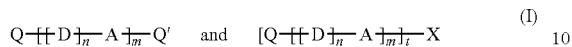
(I)

where each n is independently at least about 4, m is at least 1, t is from at least 2 to 4 and each main chain unit D is independently selected from the group consisting of:

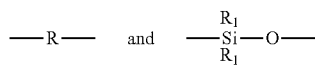

where each R is independently selected from divalent unsubstituted and substituted alkyl and aryl moieties and each R1 is independently selected from substituted and unsubstituted monovalent hydrocarbon groups free of aliphatic unsaturation; and, each A is independently selected from the group consisting of a valence bond and main chain

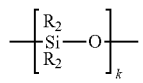

units of the structure:
where k is from 1 to 10, preferably from 1 to 5; and each Q and Q' is independently:

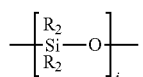

where i is from 1 to 10, preferably from 1 to 5; and X is an aliphatic aromatic or organosilyl moiety as defined hereinbelow valence bonded to txA moieties.

In some embodiments, the second component comprises at least one compound capable of reacting with and curing the first component and selected from the group consisting of: 1) polyunsaturated organic aliphatic, aromatic and alkyl aromatic compounds; and 2) linear, branched and cyclic organosiloxanes selected from the group having the general formulae;

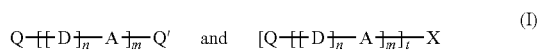
(I)

where each n is independently at least about 4, m is at least 1, t is from at least 2 to 4 and each main chain unit D is independently selected from the group consisting of:

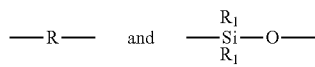

where each R is independently selected from divalent unsubstituted and substituted alkyl and aryl moieties and each R1 is independently selected from substituted and unsubstituted monovalent hydrocarbon groups free of aliphatic unsaturation; and, each A is independently selected from the group consisting of a valence bond and main chain units of the structure:

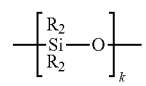

where k is from 1 to 10, preferably from 1 to 5; and each Q and Q' is independently:

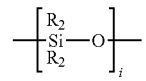

where i is from 1 to 10, preferably from 1 to 5; and X is an aliphatic aromatic or organosilyl moiety as defined hereinbelow valence bonded to txA moieties. linear, branched and cyclic organosiloxanes having the general formula $$[E-J]_p-G \quad (II)$$

where p has a value of from 1 to 4 and J is:

where v has a value of at least 0; and E is selected from the group consisting of a valence bond and R2 groups; and G is selected from a valence bond and the group consisting of substituted and unsubstituted monovalent and polyvalent silicon atoms and carbon atoms directly linked by valence bonds to p J groups and to (4-p) $R_2$ groups.

Each $R_2$ if present in the elements A, Q, Q', J and E of the above preferred embodiments of the organopolysiloxane and compound is independently selected from the group consisting of substituted and unsubstituted monovalent hydrocarbon groups free of aliphatic unsaturation and reactive groups.

Preferably any Q or Q' group in component A not containing any reactive substituent is less than about 20, preferably less than about 10 main chains units from the nearest main chain unit containing at least one reactive group in the same molecule.

X in the reactive organopolysiloxane is preferably selected from divalent moieties such as —S—, —O—, —NR— and

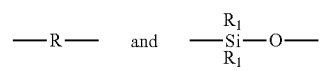

where each R is independently selected from divalent unsubstituted and substituted alkyl and aryl moieties and each R5 is independently defined as above; and trivalent moieties such as —N—, —P— and —P(O)— and trivalent substituted and unsubstituted hydrocarbon groups free of aliphatic unsaturation,

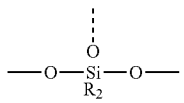

where R2 is as defined above.

In some embodiments, the number of reactive groups in each molecule of the organopolysiloxane is at least 2 and the ratio of the average total number of main chain units in the reactive organopolysiloxane of the first component to the average number of reactive groups contained therein is at least about 50, preferably at least about 100, for example 150.

The term substituted and unsubstituted monovalent hydrocarbon groups free of aliphatic unsaturation connotes alkyl, aryl, alkyl-aryl, halogen substituted groups such as chloro- or fluoro-alkyl or -aryl, cyanoalkyl and cyanoaryl.

In some embodiments, the organopolysiloxane may be selected from one or more of dimethylpolysiloxanes, diphenylpolysiloxanes, diphenyldimethylpolysiloxane copolymers, and cyclosiloxanes.

The term "PDMS" refers to polydimethylsiloxane.

The term "hydride terminated PDMS" refers to Si—H hydride terminated polydimethylsiloxane.

The term "vinyl-terminated PDMS" refers to vinyl-terminated polydimethylsiloxane. In some embodiments, the organopolysiloxane is a reactive dimethylpolysiloxanes having a formula $CH_2=CH-Si(CH_3)_2-O-[-Si(CH_3)_2-O-]n-Si(CH_3)_2-CH=CH_2$, having reactive vinyl end groups, wherein n is sufficient to impart a molecular weight as described herein. Dimethylpolysiloxanes typically exhibit a refractive index of about 1.40, 25° C. at 598 nm.

In some embodiments, the organopolysiloxane is a reactive diphenyldimethylpolysiloxane copolymer including a diphenyl functionality, e.g., $CH_2=CH-Si(CH_3)_2-[-Si(CH_3)_2-O-]n-[Si(Ph)_2-O]m-Si(CH_3)_2-CH=CH_2$, wherein n and m are sufficient to impart a molecular weight as described herein and m>1. which may increase the refractive somewhat compared to dimethylpolysiloxanes. The refractive index may range from 1.40 to 1.60 at 25° C. at 598 nm, depending on proportion of phenyl functionalities.

In some embodiments, the organopolysiloxane is a fluorosilicone based on trifluoropropyl methyl polysiloxane polymers, e.g., $CH_2=CH-Si(CH_3)_2-O-[-Si(CH_3)(CH_2CH_2CF_3)-O-]n-Si(CH_3)_2-CH=CH_2$, which may exhibit a typical refractive index of 1.38 at 25° C. at 598 nm. The trifluoropropyl group contributes polarity to the polymer to result in swell resistant to organic solvents such as gasoline or jet fuel. The term 'capable of reacting with and curing said first component' connotes that the reactive sites in the first and second components are so selected that a major portion of the crosslinks formed are intermolecular (that is they are formed between different organopolysiloxane molecules) and only a minor portion of the crosslinks formed are intramolecular (that is, they are formed between reactive sites in the same organopolysiloxane molecule).

In some embodiments, a cured organopolysiloxane gel is provided having a hardness as measured by a texture analyzer (B) of from about 1 to about 50 g and an ultimate elongation (U) of at least about 100%, such that: where K is at least about 1700, for example at least about 1800, preferably at least about 2000, for example at least about 2200, most preferably at least about 3000, for example at least about 3500. Preferably in this embodiment the hardness as measured by a texture analyzer is from 2 to 40 g and preferably the ultimate elongation is at least about 150, for example at least about 250 more preferably at least about 300%.

In some embodiments, a cured organopolysiloxane gel composition is provided having a hardness as measured by a texture analyzer of from about 1 to about 50 g with an ultimate elongation (U) of at least 100% such that: where Ts is the tensile strength of the composition and L is at least about 45, for example at least about 50, preferably at least about 60, for example at least about 70, most preferably at least about 80, for example at least about 90. Preferably in this embodiment also the hardness as measured by a texture analyzer is from 5 to 40 g and the ultimate elongation preferably at least about 150%, for example at least about 250%, more preferably at least about 300%.

In some embodiments, a crosslinked gel composition is provided having a hardness as measured by a texture analyzer, or Voland hardness, of from about 1 to about 40 g, preferably about 5 to about 30 g, most preferably about 10 to about 20 g and an ultimate elongation of at least about 500%, more preferably at least about 1000%, most preferably at least about 1100%.

In some embodiments, articles and methods are provided for protecting a substrate, which may comprise an optical fiber interface, which employ the cured organopolysiloxane gels as described in any one or more of the above aspects and embodiments of the present invention, and assemblies comprising a substrate at least partially encapsulated by the gel compositions as described in one or more of the above aspects and embodiments of the present invention; particularly those gels and gel compositions having the above enumerated combinations of hardness as measured by a texture analyzer and ultimate elongation properties and/or tensile strength and ultimate elongation properties.

In some embodiments, articles are provided comprising a cured gel for protecting a substrate wherein the organopolysiloxane may be pre-cured (that is, cured before coming into contact with the substrate), or cured after coming into contact with the substrate. In one aspect, the organopolysiloxane gel is cured before contacting the optical fiber substrate. If the organopolysiloxane is pre-cured, the articles and methods include means for deforming the cured organopolysiloxane gel into contact, which preferably is close and conforming contact, with an optical fiber substrate. Such means for deforming the gel into contact with the substrate may comprise a force means or a means for compressing the gel into contact with the substrate and/or means for maintaining the cured organopolysiloxane gel in contact with the substrate by compression.

In some embodiments, cured organopolysiloxane gels and gel compositions are provided having a cohesive strength greater than the adhesive strength of the said gel or composition.

The term valence bond connotes a single covalent bond directly linking two atoms of the main chain of organopolysiloxane or compound or organopolysiloxane and compound together.

The term cured organopolysiloxane gel connotes that portion of the compositions of the invention containing siloxane or organic moieties. Thus the cured organopolysiloxane gel contains the unreactive diluent and wholly or partly reacted products derived from reaction of first and second components as described hereinabove.

The index-matching gel composition may include one or more unreactive diluents, or chain extenders, as provided in U.S. Pat. No. 5,079,300, incorporated herein by reference in its entirety.

The diluent may be chosen from a variety of inert diluents which are compatible with organopolysiloxanes and gels thereof. Preferably the diluent is an organosiloxane inert under the crosslinking conditions used to prepare the cured organopolysiloxane gel and having a viscosity of from about 1 to about $10^6$ centipoises (cp), preferably from about 30 to about 1000000, for example about 50 to about 30000.

The molecular weight of the diluent in general may be from about 100 to about 200,000 Daltons preferably about 1,000 to about 140,000, most preferably about 4,000 to about 50,000 although the preferred and highly preferred ranges generally will depend on the diluent concentration and the average molecular weight between crosslinks as disclosed in the examples.

In some embodiments the diluent comprises a dimethylsiloxane although in some circumstances it may be desirable to provide a methyl phenyl siloxane or mixtures and copolymeric oligomers of dimethylsiloxanes and diphenyl siloxanes, depending on the desired degree of compatibility with the crosslinked polysiloxane. Without being bound by theory, the molecular weight of the inert diluent may play a role in determining the properties of the cured organopolysiloxane gel.

The index-matching gel may include one or more unreactive diluents inert under the curing conditions used to crosslink said organopolysiloxane and said organopolysiloxane having been crosslinked in the presence of said diluent.

In specific embodiments, the inert diluent includes one or more diluent non-reactive cyclosiloxanes. The cyclosiloxane may be selected from a cyclotrisiloxane (D3), cyclotetrasiloxane (D4), cyclopentasiloxane (D5), cyclohexasiloxane (D6), cycloheptasiloxane (D7). The cyclosiloxane base may be characterized by the number of "D" units $((CH_3)_2SiO)$ in the cyclic structure, with D3 indicating cyclotrisiloxane base (hexamethylcyclosiloxane), and so forth. Each D unit on the base has 2 methyl($CH_3$) functional groups. Within a cyclosiloxane base, one, two, three, four, or more of the methyl groups may be replaced by phenyl groups. In some embodiments, phenyl groups replace both methyl groups on the same D unit, resulting in a diphenyl cyclosiloxane base, or four of the methyl groups can be replaced by phenyl groups resulting in a tetraphenyl cyclosiloxane base; or six of the methyl groups can be replaced by phenyl groups resulting in a hexaphenyl cyclosiloxane. The cured index-matching gel may include about 40% up to about 95% by weight, or about 45% up to about 85% by weight, or about 50% to about 80% by weight of an unreactive diluent.

In some embodiments, the refractive index of the non-reactive diluent is higher than that of the curable or cured crosslinked gel without diluent. In this way, the gel may be tuned to a particular refractive index by addition of the non-reactive diluent. In particular, the index-matching base gel composition may include one or more of a diluent diphenyl cyclotrisiloxane (D3); triphenyl cyclotrisiloxane (D3), diphenyl cyclotetrasiloxane (D4), tetraphenyl cyclotetrasiloxane (D4), hexaphenyl cyclotetrasiloxane (D4); methyl cyclopentasiloxane (D5), diphenyl cyclopentasiloxane (D5), tetraphenyl cyclopentasiloxane (D5), hexaphenyl cyclopentasiloxane (D5); methyl cyclohexasiloxane (D6), diphenyl cyclohexasiloxane (D6), tetraphenyl cyclohexasiloxane (D6), hexaphenyl cyclohexasiloxane (D6); diphenyl cycloheptasiloxane (D7), or a mixture thereof. In particular, the index-matching base gel composition may include one or more of a diluent selected from 1,1-diphenyltetramethylcyclotrisiloxane (CAS RN 1693-51-2), 1,3,5-triphenyltrimethylcyclotrisiloxane (CAS RN 546-45-2), 2,2,4,4,6,6-hexamethyl-8,8-diphenyl-cyclotetrasiloxane, octamethyldiphenyl-cyclopentasiloxane, decamethyl diphenyl cyclohexasiloxane, tetramethyltetraphenyl-cyclotetrasiloxane, or hexamethyl tetraphenyl-cyclopentasiloxane. In some specific embodiments, the diluent is 2,2,4,4,6,6-hexamethyl-8,8-diphenyl-cyclotetrasiloxane, CAS RN: 1693-44-3, Refractive Index 1.513, MW. 428.82 g/mol, commercially available from Alfa Chemistry, US, ACM1693443, or Chemos GmbH, Germany, c23372270. In some embodiments, the diluent is 1,1-diphenyltetramethylcyclotrisiloxane, CAS RN 1693-51-2, available from ChemTik, Berlin, Germany, Product Code: CTK4D3277. In some embodiments, the diluent is 1,3,5-triphenyltrimethylcyclotrisiloxane, CAS RN 546-45-2, available from GELEST, Morrisville, Pa., Product Code: SIT8705.0.

In some embodiments, cured organopolysiloxane gels are provided using larger amounts of inert diluent to improve one or more properties such as decreased time to self-cure, improving self-cleaning, or tailoring tack while decreasing tear-out after at least 2, 3, 4, 5, 6, 7, 8, 9, 10, 11, 12, or more cycles of removing the optical fiber from the gel.

In some embodiments, as the molecular weight of the diluent is increased the tack exhibited by a given cured organopolysiloxane gel increases. In some embodiments, as the molecular weight of the diluent is increased, evidence of incompatibility, for example, syneresis is evidenced.

The term syneresis connotes the "bleeding" or exuding and exclusion from a cured organopolysiloxane gel of at least a portion of the diluent in which the cured organopolysiloxane gel was prepared or swollen. This characteristic is particularly likely to be exhibited if a cured organopolysiloxane gel containing diluent is subjected to compression. One way to measure stability to syneresis is by immersing cured gel into fresh diluent and measuring the amount of fluid uptake. Higher stability is indicated by larger diluent uptake. Stability may also be measured by compressing a cured gel sample until a pressure level is reached at which syneresis commences. Higher compression forces indicate more stable gels. Another way to measure syneresis is by aging the gel under a specific condition, followed by loss in weight of the gel. In some embodiments, there are preferred ranges of diluent molecular weight for best combinations of tack, stability to and absence of significant syneresis under compression and the other hereinabove mentioned superior physical properties desired in cured organopolysiloxane gels especially cured organopolysiloxane gel compositions.

In general the greater the distance between crosslinks in the cured organopolysiloxane gel, the higher the upper limit of the preferred range of diluent molecular weights. In some embodiments, the cured organopolysiloxane gels having Mc values of at least about 15,000 prepared in the presence of inert diluents of number average molecular weight (Mn) between about 100 and about 15,000 exhibit especially beneficial tack properties and stability towards syneresis as described above; the more preferred range of diluent Mn is about 1000 to about 5,500; the most preferred range of diluent Mn is about 4,000 to 5,500.

Cured organopolysiloxane gels having Mc values of at least about 20,000 and 40,000 prepared in the presence of inert diluents further comprising a diluent having Mn from about 100 to 20,000 may exhibit especially beneficial tack properties and stability towards syneresis as described above; the more preferred range of diluent Mn is about 1000 to about 10,000; the most preferred range of diluent Mn is about 4,000 to 10,000. Cured organopolysiloxane gels having Mc values of from about 40,000 to about 60,000 may be prepared in the presence of inert diluent of Mn from about 100 to about 40,000 exhibit especially beneficial tack properties and stability towards syneresis as described above; the more preferred range of diluent Mn is about 1000 to about 20,000; the most preferred range of diluent Mn is about 4,000 to 20,000. Cured organopolysiloxane gels having Mc values from about 60,000 to about 100,000 prepared in the presence of inert diluent of Mn from about 100 to about 60,000 exhibit especially beneficial tack properties and stability towards syneresis as described above; the more preferred range of diluent Mn is about 1000 to about 35,000; the most preferred range of diluent Mn is about 4,000 to 30,000. Organopolysiloxane gels having Mc values from about 100,000 to about 200,000 prepared in the presence of inert diluent of Mn from about 100 to about 100,000 may exhibit beneficial tack properties and may be stable to syneresis as described above; the range of additional diluent Mn is about 1000 to about 55,000; or 4,000 to 30,000. Cured organopolysiloxane gels having Mc values of at least about 200,000 prepared in the presence of inert diluent of Mn from about 100 to about 200,000 may exhibit especially beneficial tack properties and stability towards syneresis as described above; the more preferred range of diluent Mn is about 1000 to about 100,000; the most preferred range of diluent Mn is about 4,000 to 30,000. It should be noted that with additional dimethyl siloxane oligomeric diluents of molecular weight significantly above 25,000 particular care is necessary to ensure adequate dispersing and mixing of the reactive components used to prepare the cured organopolysiloxane gel.

In some embodiments, the diluent includes only a non-reactive diluent. In some embodiments, the diluent may further include a mono functional vinyl diluent.

In addition, the index-matching gel may be prepared from a composition including chain extenders.

The index-matching gel may be prepared from a composition comprising a polymeric liquid selected from polyether polyols and end-substituted polyether polyols having a refractive index in the range 1.44-1.52. Examples of polymeric liquids are polymethylene glycol, polyethylene glycol, polypropylene glycol, polyisopropylene glycol, poly(oxyethylene-oxypropylene)glycol, poly(oxymethylene) dimethyl ether, poly(oxypropylene)dipropyl ether, poly(oxyethylene)dipropyl amines, poly(oxypropylene) monoethyl ether, and the like.

Stability to syneresis may be measured by immersing cured gel into fresh diluent and measuring the amount of fluid uptake. Higher stability is indicated by larger diluent uptake. Stability may also be measured by compressing a cured gel sample until a pressure level is reached at which syneresis commences. Higher compression forces indicate more stable gels. Of course, as is understood by those of ordinary skill in the art, the ability to withstand compression without exhibiting syneresis depends on a number of factors including but not limited to diluent compatibility with the crosslinked organopolysiloxane, diluent concentration, the molecular weight between crosslinks of the crosslinked organopolysiloxane and the temperature of the gel.

In some embodiments, index matching curable gels include a first component including a first component that is a reactive organopolysiloxane and a second component containing a reactive crosslinker.

Reactive polysiloxanes useful for the first component of compositions of the invention include one or more of hydroxy-, alkoxy-, acyloxy-, amino-, oxime-, hydrogen- and vinyl-dimethyl and dihydroxy-, diacyloxy-, diamino-, dioxime-, dialkoxy-, dihydrogen- and divinyl-methyl terminated polydimethylsiloxanes and hydroxy-, alkoxy-, acyloxy-, amino-, oxime-, hydrogen- and vinyl-dimethyl and dihydroxy-, diacyloxy-, diamino-, dioxime-, dialkoxy-, dihydrogen- and divinyl-methyl terminated dimethylsiloxane copolymers with diphenyl siloxanes and non-siloxane monomers such as alkylene oxides, for example ethylene and propylene oxide and mixture thereof, divinyl benzene, styrene, and alpha-methylstyrene and tetramethyldisiloxane-ethylene, dimethyl siloxane-silphenylene and dimethyl siloxane-silphenylene oxide copolymers, dimethyl siloxane-alpha-methylstyrene and dimethylsiloxane-bis-phenol A carbonate block copolymers. These preferred siloxane polymers, copolymers and block copolymers may also contain the above indicated reactive functionalities dispersed along the main chain provided that the reactive functionalities are sufficiently far apart as indicated hereinabove.

In some embodiments, materials for use in the second component containing reactive groups capable of reacting with and curing the first component include one or more of unsaturated aliphatic, aromatic or alkyl-aromatic compounds such as diallyl maleate, diallyl fumarate, triallyl citrate, divinyl adipate, divinyl benzene, diallyl phthalate, triallyl mellitate, tetraallyl pyromellitate, triallyl cyanurate, triallyl isocyanurate, glycerine triacrylate and trimethacrylate, pentaerythritol tri- and tetra-acrylate and -methacrylate which are examples of low molecular weight compounds containing at least three crosslinkable sites; the hereinabove mentioned preferred materials for the first component, otherwise similar materials of lower molecular weight which are examples of oligomeric materials containing at least three crosslinkable sites; and siloxanes such as tetrakis (dimethylsiloxy)silane, methyltris(dimethylsiloxy)silane, phenyl-tris(dimethylsiloxy)silane, tetraethoxysilane, tetramethoxysilane, phenyl triethoxysilane, methyl triethoxysilane, phenyl triacetoxysilane, 1,3,5,7-tetramethyltetravinyl cyclotetrasiloxane and 1,3,5,7-tetra-methylcyclotetrasiloxane.

The index-matching gel may be prepared from a composition capable of being further polymerized or crosslinked by means of heat or actinic radiation. Such compositions may contain monomers, oligomers, and higher molecular weight, liquid pre-polymers (including liquid silicone pre-polymers) having the required refractive index that have attached thereto vinyl, acrylate, epoxy, isocyanate, silane, hydride, hydrosilane, and other polymerizable functional groups well known to those skilled in the polymer art. Typically polymerizable compositions also contain initiators, catalysts, accelerators, sensitizers, and the like to facilitate the polymerization process.

Especially when materials comprising first and second component contain vinyl groups and silicon bonded hydrogen atoms, use of a catalyst is preferred to facilitate reaction and cure.

Catalysts for such reactions are well known to those of ordinary shall in the art and include platinum compounds. Suitable platinum catalysts include platinum-divinyltetramethyldisiloxane complex in xylene (United Chemical Technologies (UCT), Bristol, Pa., PC072), or in vinyl terminated polydimethylsiloxane (United Chemical Technologies (UCT), Bristol, Pa., PC075) or platinum-cyclovinylmethylsiloxane complex in cyclic vinylmethylsiloxanes (United Chemical Technologies (UCT), Bristol, Pa., PC085), or platinum catalyst such as 3-4% Pt in silicone oil, (McGann NuSil Cat-50). The platinum catalyst may be present in about 0.01 to about 3 wt %, or about 0.02 to about 1 wt %, or about 0.03 to 0.5 wt % compared to the total weight of the first part of the unfilled composition. Especially when the reactive groups consist only of silanol moieties, acidic or mildly basic conditions will result in condensation and curing. Organopolysiloxanes carrying reactive silanol groups may be condensed with multifunctional organosiloxanes or silanes which condense with the silanol groups. Especially suitable functionalities for such condensation are acyloxy, amine, oxime and alkoxy reactive groups. Such condensations are often catalyzed by titanates and carboxylic acid salts of zinc, iron and tin. Organopolysiloxanes and organosiloxanes of silanes carrying reactive halogen atoms bonded to silicon, for example chlorine atoms, can be cured with moisture or by reaction with, for example dimethylamine substituted organopolysiloxanes, organosiloxanes or silanes.

Specific examples of compounds particularly useful in the practice of this invention include, in addition to the compounds described in the examples, acetoxy terminated polydimethylsiloxane with a molecular weight of about 36,000; methyldiacetoxy terminated polydimethylsiloxane with a molecular weight of about 36,000; chlorine terminated polydimethylsiloxane with a molecular weight of 425 to 600; dimethylamine terminated polydimethylsiloxane with a molecular weight of about 425 to about 600; ethoxy terminated polydimethylsiloxane with a molecular weight of from about 360 to 1200; vinyldimethyl terminated polydimethylsiloxane with a viscosity of from about 2 to about 1,000,000 cs; vinylphenylmethyl terminated polydimethylsiloxane with a viscosity of from about 1,000 to about 100,000 cs; divinylmethyl terminated polydimethylsiloxane with a viscosity of from about 1,000 to about 100,000 cs; vinyldimethyl terminated dimethyl siloxane-methyl-vinyl siloxane (0.3-0.4%) copolymer with a viscosity of from about 1,000 cs; vinyldimethyl terminated polydimethylsiloxane vinyl Q-resin dispersion with a viscosity of from about 4,000 to about 70,000 cs; hydrogen terminated polydimethylsiloxane with a molecular weight of from about 400 to about 10,000; aminopropyldimethyl terminated polydimethylsiloxane with a molecular weight of from about 50 to about 2,000; aminobutyldimethyl terminated polydimethylsiloxane with a molecular weight of from about 50; carboxypropyldimethyl terminated polydimethylsiloxane with a molecular weight of from about 2500 to about 3500; chlorodimethyl terminated polydimethylsiloxane with a molecular weight of from about 2500 to about 3500; dimethylsiloxane-methylvinylsiloxane copolymers with from about 1.0 to about 20% of the vinyl comonomer having viscosities in the range of from about 250 to about 300,000 cs; dimethysiloxane copolymers with acryloxypropylmethyl siloxane, aminopropylmethyl siloxane, (chloromethylphenylethyl)methyl siloxane, chloropropylmethyl siloxane, chloropropylmethyl siloxane (vinyldimethylsiloxy terminated), (methacryloxy-propyl)methyl siloxane, octyloxymethyl siloxane; branched polydimethylsiloxanes having 2 to 3 (T-structure) branch points with aminoalkyl, carboxypropyl, chloropropyl, glycidoxypropyl, mercaptopropyl, methacryloxypropyl and vinyl reactive groups at each branch point; branched polydimethylsiloxanes having 2 to 3 (T-structure) branch points with aminoalkyl, carboxypropyl, chloropropyl, glycidoxypropyl, mercaptopropyl, methacryloxypropyl and vinyl reactive groups at each branch terminus; polymethylhydrosiloxanes having molecular weights from about 360 to about 5000; copolymers of methylhydrosiloxanes (from about 0.5 to about 60% by weight) with dimethylsiloxanes having molecular weights from about 900 to about 63,000; copolymers of methylhydrosiloxane (from about 0.5 to about 50% by weight) with phenylmethylsiloxane having molecular weights from about 1000 to about 2,000; and silanol and vinyldimethyl terminated dimethydiphenylsiloxane copolymers having from about 3 to about 25% by weight diphenylsiloxane groups. Many of these materials may be obtained from United Chemical Technologies (UCT), Bristol, Pa.

The curable compositions of this invention and the compositions made according to this invention may contain various additional ingredients such as flame retardants, corrosion inhibitors, antioxidants, UV light stabilizers, fungicides and other biocides, fillers to enhance or decrease refractive index, adjust density or other physical properties. Such additives or fillers also may be used to regulate or affect the rate of extent of cure and crosslinking and affect the overall cost of the final composition. For example, the filler may include a submicron or nanoparticle silica powder. Due to the index matching limitations of the nanoparticle powder, these materials are available from 1.46 to 1.59 refractive index range. In one objective, use of the index-matching gel improves the return loss in a mechanical fiber splice. The silica particles may be used, e.g., as a rheology agent or to tune the refractive index of the cured composition.

In some embodiments, the submicron silica particles are non-aggregated silica particles to be incorporated in the liquid polymers and copolymers are optionally surface modified with silane (also called organosilicon) coupling agents to improve their dispersibility in the polymer matrix and, if required, to adjust the refractive index of the surface of the silica particles so that it substantially matches the refractive index of the polymer medium. In some embodiments, the silica particles are submicron amorphous silica particles. In some embodiments, the silica particles have a submicron mean diameter. The index-matching base gel composition may include one or more submicron silica powders. The particle size of the silica gel, silica sol, fumed silica, or silica powder is sub-micron, preferably less than 500 nanometers, less than 200 nanometers, less than 150 nm, less than 100 nm, less than 50 nm, less than 25 nm, less than 10 nm in diameter. In some embodiments, the mean diameter of the silica particles is selected from 1-200 nm, 5-150 nm, 10-100 nm, or 10-50 nm.

In some embodiments, the index-matching gel may include from 0-50 wt %, 5-45 wt %, 10-40 wt %, or 25-35 wt % submicron silica particles.

The index matching gel may further comprise various additives selected from antioxidants, stabilizers, moisture scavengers, antimicrobials, fungicides, cure inhibitors, and tackifiers. The index matching gel may further include one or more additives at from 0.001 wt % to 2 wt % of the gel composition.

The gel may include a variety of additives, including stabilizers and antioxidants such as hindered phenols (e.g., Irganox 1076, commercially available from BASF Corporation, Florham Park, N.J.) phosphites (e.g., Irgafos™ 168, commercially available from BASF Corporation, Florham Park, N.J.), metal deactivators (e.g., Irganox™ D1024 from BASF Corporation, Florham Park, N.J.), and/or sulfides (e.g., Cyanox™ LTDP, commercially available from Cytec Industries Inc., Solvay Group, Woodland Park, N.J.) light stabilizers (e.g., Cyasorb™ UV-531, commercially available from Cytec Industries Inc., Solvay Group, Woodland Park, N.J. and/or flame retardants such as halogenated paraffins (e.g., Bromoklor™ 50, commercially available from Ferro Corp. of Hammond, Ind., or Dover Chemical Corp., Dover Ohio), and/or phosphorous containing organic compounds (e.g., Fyrol™ PCF (tris (2-chloroisopropyl)phosphate) and Phosflex™ 390 (isodecyl diphenyl phosphate), both commercially available from ICL Industrial Products) and/or acid scavengers (e.g., DHT-4A™, commercially available from Kyowa Chemical Industry Co. Ltd through Mitsui & Co. of Cleveland, Ohio, and hydrotalcite). Other suitable additives include biocides, tackifiers and the like described in "Additives for Plastics, Edition 1" published by D.A.T.A., Inc. and The International Plastics Selector, Inc., San Diego, Calif.

In some embodiments, the article on which, within which or around which the curable compositions of the invention are cured is primed with a silane coupling agent. Such coupling agent are well known in the art as being advantageous for improving the bonding of addition cure silicones to substrates. These coupling agents include but are not limited to trichlorosilane, organochlorosilanes such as vinyltrichlorosilane and methylvinyldichlorosilane, organosilane esters such as methyltriethoxy and methyltrimethoxy silanes, organofunctional silanes such as vinyltrimethoxysilane and vinyltriacetoxysilane, methacryl organosilanes such as gamma-methacrloxypropyltrimethoxysilane, epoxy silanes such as beta-(3,4-epoxycyclohexyl)ethyltrimethoxysilane and amino organosilanes such as gamma-aminopropyltriethoxysilane, silane titanates and the like. Typically the coupling agent is mixed into a solvent, for example one which activates the coupling agent. The solution may be brushed onto the substrate or applied by other methods well known to those of average skill in the art such as casting, dipping spraying and the like. After application the primer coated article is allowed to sit for at least about 30 minutes so that the solvent can evaporate and the silane hydrolysed by moisture in the air. Once the priming is completed the curable compositions of the invention can be poured into on or around the substrate and cured.

The term crosslink refers to a covalent bond formed by chemical reaction between two crosslinkable sites from which sites depend a total of three or more molecular segments; or at least two covalent bonds, each formed by chemical reaction between two crosslinkable sites, attaching a chemical moiety to at least two polymer chains such that the chemical moiety has at least three molecular segments depending therefrom. Typically the chemical moiety is the residue of a low molecular weight compound or a low molecular weight oligomeric material containing at least three crosslinkable sites. Specifically, the term crosslink contemplates both trifunctional (T-links) (that is crosslinks having three molecular segments depending therefrom) tetrafunctional (H-links) (that is crosslinks having four molecular segments depending therefrom) and higher functionality crosslinks.

Without being bound by theory it is believed that crosslinking by reaction of functionalized molecules, where the mole equivalent ratios are far from the stoichiometric ranges needed to achieve a crosslinked gel network having adequate physical properties, can result, not in desired inter-molecular closed loop formation, but in extensive linking of chains to the cured organopolysiloxane gel structure by a very few and often only one reactive site such that many of the chains form dangling "tails" from the three dimensional cured organopolysiloxane gel. Such dangling chains, although they do form part of the cured organopolysiloxane gel and thus contribute to the cured organopolysiloxane gel fraction (that fraction of the original composition comprising organopolysiloxane and crosslinker rendered insoluble by co-reaction), make no substantial contribution to important mechanical properties of the cured organopolysiloxane gel. Thus we have discovered that the cured organopolysiloxane gels prepared by the methods of this invention having similar hardness values as measured by a texture analyzer compared to those of soft cured organopolysiloxane gels prepared by the methods of the prior art unexpectedly exhibit much higher ultimate elongation and toughness properties with greater tensile strength and can accept significant amounts of diluent without exhibiting syneresis especially under compression while still maintaining desirable levels of tack.

The index-matching gel exhibits self-healing properties when the fibers are withdrawn from the gel, e.g., from within the housing. Gel cohesion is stronger than gel adhesion to the surface of the fibers. Upon withdrawal of the fibers immersed in and closely surrounded by the gel, the gel closes in on the void created by the fiber withdrawal, and the fibers exhibit little to no trace of the gel. In addition, the gel is not drawn outwards by the fibers.

Self-healing means that the fiber passage in the gel re-closes after a 125 micron optical fiber is withdrawn from the gel at atmospheric pressure. It is one objective to have the gel re-seal fully to close out the external environment from the fiber-fiber interface space within the connector-adaptor. It is another objective that the gel will self-heal as evidenced by visual appearance. In embodiments, the index matching gel will self-heal within 1 second, 2 seconds, 3 seconds, 4 seconds, 5 seconds, 10 seconds, 20 seconds, 30 seconds, 45 seconds, or within one minute of withdrawing the optical fiber from the gel.

It is one objective that the index-matching self-healing gel will self-heal meaning that the fiber passage substantially or completely disappears such that is no longer identifiable and/or the gel is homogeneous/consistent/undisturbed across the previous location of the fiber passage.

In one objective, the self-healing gel would re-seal to be liquid tight, for example, at atmospheric pressure, after 2, 3, 4, 5, 6, 7, 8, 9, 10, 15, 20, 25, 30 or more cycles of insertion and withdrawal of an optical fiber at ambient temperature. In a further objective, the index-matching gel will be able to self-heal after from 2-200 cycles, 5-100 cycles, 10-50 cycles, or at least 10 re-close cycles, per GR326 compliance life testing.

In some embodiments, the self-healing gel would re-seal to exclude airborne dust, particulates, and aerosolized liquids. However, in some embodiments, the index-matching gels may not fully prevent diffusion of vapor or gas phase substances.

In a further objective, the gel self-heals at least along the outside or external environment face to prevent contamination of the fiber-fiber interface. In some embodiments, the re-sealing gel deposit is non-homogenous, either due to a degree of cure gradient or due to a multi-gel layered deposit, there may be re-close difference along the full length.

It is another objective that the gel self-heals along the entire length of the void created by withdrawal of the fiber such that the re-sealing gel deposit in the connector/adaptor is completely homogenous. Fully re-closing along the length of the fiber aids the cleaning function of the gel, serving to wipe off any residual contamination that may be on the fiber.

It is another objective that the self-healing index-matching gel re-close or self-heal after the fiber has been in the gel for a certain period of time selected from 10 minutes, 30 minutes, 1 hour, 1 day, 1 week, 1 month, 3 months, 6 months, 12 months, 18 months, 24 months, 30 months, 24 months, 36 months, or 48 months, and then removed. It is one objective that the gel be able to self-heal and re-close after any practical life duration including several years.

It is another objective that the self-healing index-matching gel is a cured polysiloxane gel that does not exhibit tracking or tear-out of the gel for at least 6 cycles, at least 8 cycles, or at least 12 cycles after inserting and withdrawing an optical fiber from the cured polysiloxane gel. The Refractive Index of the index-matching gel may be obtained at 589 nanometer (nm) wavelength (a.k.a. "the Sodium D line", or "nD") with a refractometer using the method of ASTM D-1218 at a fixed temperature of 25.0° C. Other wavelengths for measuring refractive-index may be selected from 402, 633, 980, and/or 1550 nm. As previously mentioned, silicones have a refractive index range of 1.38-1.60. The refractive index of the index-matching composition is preferably about the same (+/10%) as that of the optical fiber. In one aspect, the index-matching gel exhibits a refractive index of about 1.46+/-0.1, 1.46+/-0.05, or 1.46+/-0.01 by ASTM D-1218. The index-matching gel may be a silicone curing gel that exhibits good index match to the glass fiber, high optical clarity, and low absorption loss.

The cone penetration parameters may be measured according to ASTM D-217, as disclosed in U.S. Pat. No. 5,357,057 to Debbaut et al., which is incorporated herein by reference in its entirety. Cone penetration ("CP") values may range from about 70 ($10^{-1}$ millimeter) to about 400 ($10^{-1}$ millimeter). Harder gels may generally have CP values from about 70 ($10^{-1}$ millimeter) to about 120 ($10^{-1}$ millimeter). Softer gels may generally have CP values from about 200 ($10^{-1}$ millimeter) to about 400 ($10^{-1}$ millimeter), with particularly preferred range of from about 250 ($10^{-1}$ millimeter) to about 375 ($10^{-1}$ millimeter). For a particular materials system, a relationship between CP and Voland gram hardness, or gram hardness as measured by another texture analyzer, can be developed as proposed in U.S. Pat. No. 4,852,646 to Dittmer et al. In some aspects, the cured or crosslinked composition will have a cone penetration according to ASTM No. D217-68 of about 100 to about 350 ($mm^{-1}$).

In some embodiments, the gel may have an elongation, as measured by ASTM D638, of at least 55%. According to some embodiments, the elongation is at least 100%. In some embodiments, the gel may have an ultimate elongation in accordance with ASTM D638 of greater than about 200%. In other embodiments, index-matching gels in accordance with the principles of the present disclosure have ultimate elongations of at least 200 percent, or at least 400 percent, or at least 500 percent, or at least 1,000 percent.

In certain embodiments, the gel composition has less than 20% bleed out over a period of time when the gel is under compression of 50 kPa (0.5 atm) or 120 kPa (1.2 atm) at 60° C. The weight of the gel sample is recorded before and after the pressure has been applied. In certain embodiments, extender bleed out is measured on a wire mesh, wherein the oil loss may exit the gel through the mesh. Typically, gel samples should be 3 mm±0.5 mm thick and have a diameter of 14 mm±0.5 mm, and three samples should be tested from each gel. The gel sample is placed into a cylindrical hole/tube resting on a fine and rough screen, which gives enough support to hold the gel but in the meantime allows the oil to separate from the gel. Pressure is applied to the gel by placing a weight on top of a piston (which prevents the gel from creeping out of the hole). Typically, approximately 50 kPa (0.5 atm) or 120 kPa (1.2 atm) of pressure is placed on the gel sample. Then, the sample is placed in an oven at 60° C. After 24 hours, the sample is removed from the oven to clean the surface oil and weigh the gel. The sample is then returned to the oven. Weight measurements are taken every 24 hours until stabilization has occurred (e.g., when 5 weight measurements are constant).

In some embodiments, the gel has less than 20%, 15%, 10%, or 5% extender bleed out over the period of time. In certain embodiments, the oil loss is measured at 200 hours, 400 hours, 600 hours, 800 hours, 1000 hours, 1200 hours, or 1440 hours (60 days).

The tack and stress relaxation may be read from the stress curve generated when the XT.RA Dimension version 2.3 software automatically traces the force versus time curve experienced by the load cell when the penetration speed is 2.0 mm/second and the probe is forced into the gel a penetration distance of about 4.0 mm. The probe is held at 4.0 mm penetration for 1 minute and withdrawn at a speed of 2.00 millimeters/second. The stress relaxation is the ratio of the initial force ($F_i$) resisting the probe at the pre-set penetration depth minus the force resisting the probe ($F_f$) after 1 minute divided by the initial force expressed as a percentage. That is, percent stress relaxation is equal to $((F_i-F_f)/F_i) \times 100\%$ where $F_i$ and $F_f$ are in grams. In other words, the stress relaxation is the ratio of the initial force minus the force after 1 minute over the initial force. It may be considered to be a measure of the ability of the gel to relax any induced compression placed on the gel. The tack may be considered to be the amount of force in grams resistance on the probe as it is pulled out of the gel when the probe is withdrawn at a speed of 2.0 millimeters/second from the preset penetration depth.

Figure 3:
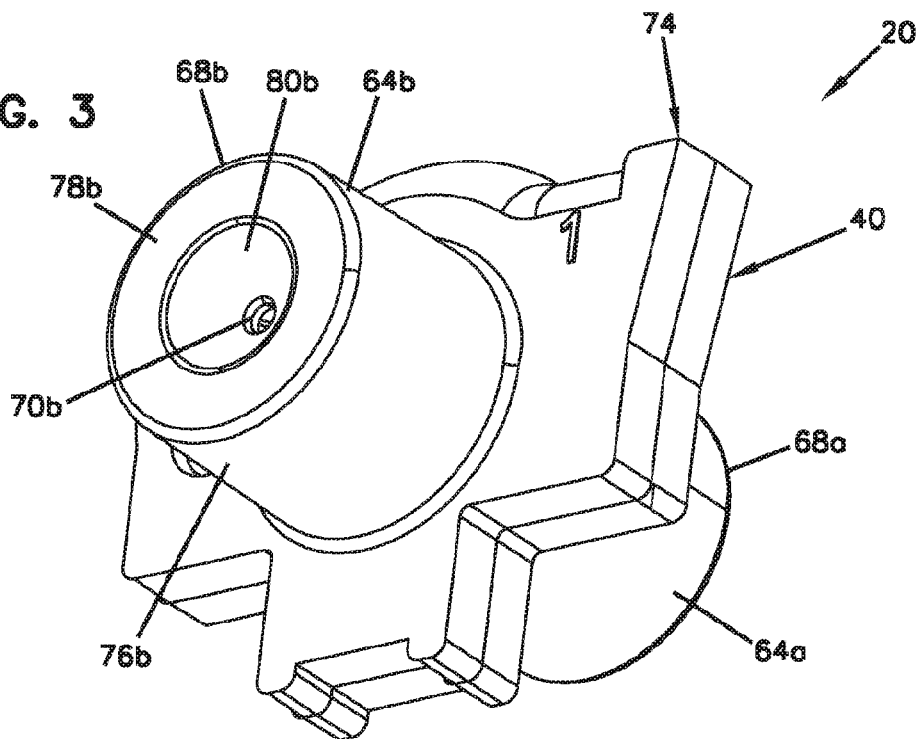
FIG. 3 is a rear, bottom, right side view of the fiber alignment device of FIG. 2.
Figure 4:
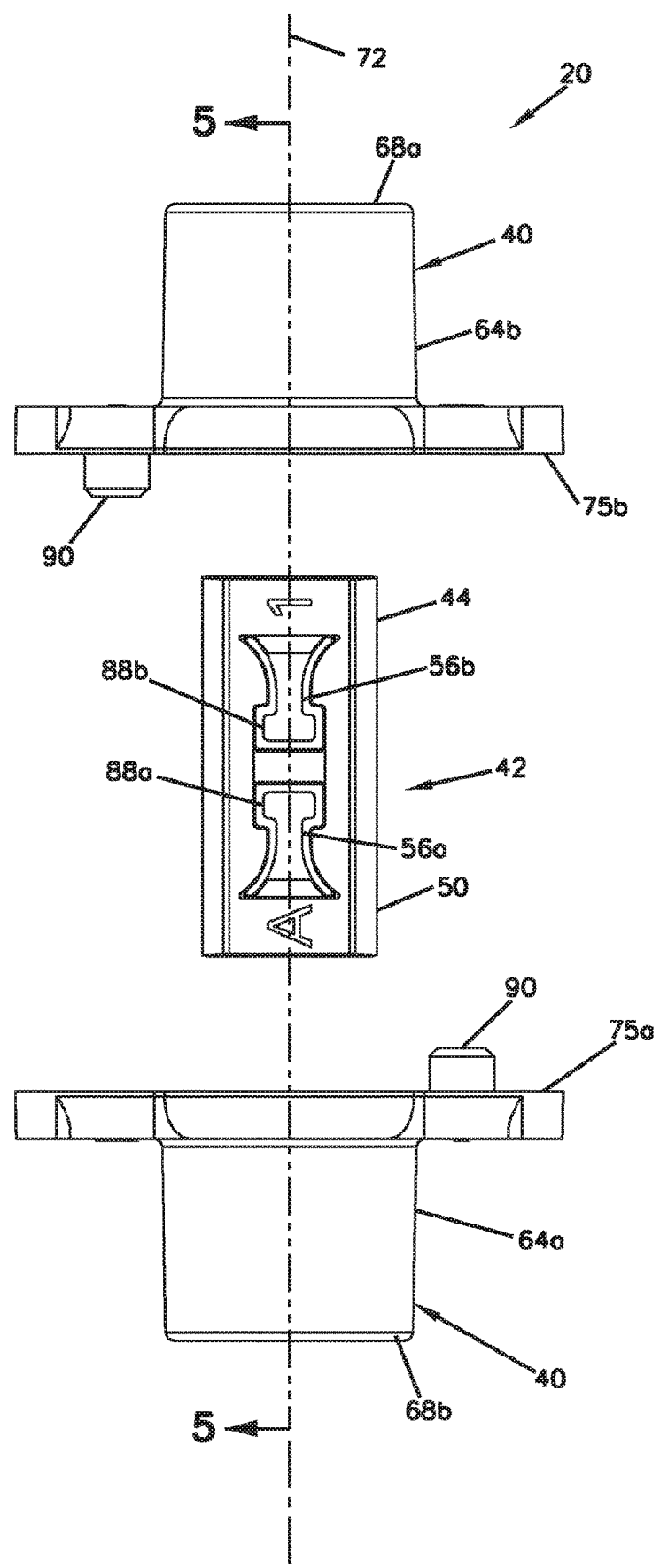
FIG. 4 is an exploded, top view of the fiber alignment device of FIG. 2.
Figure 5:
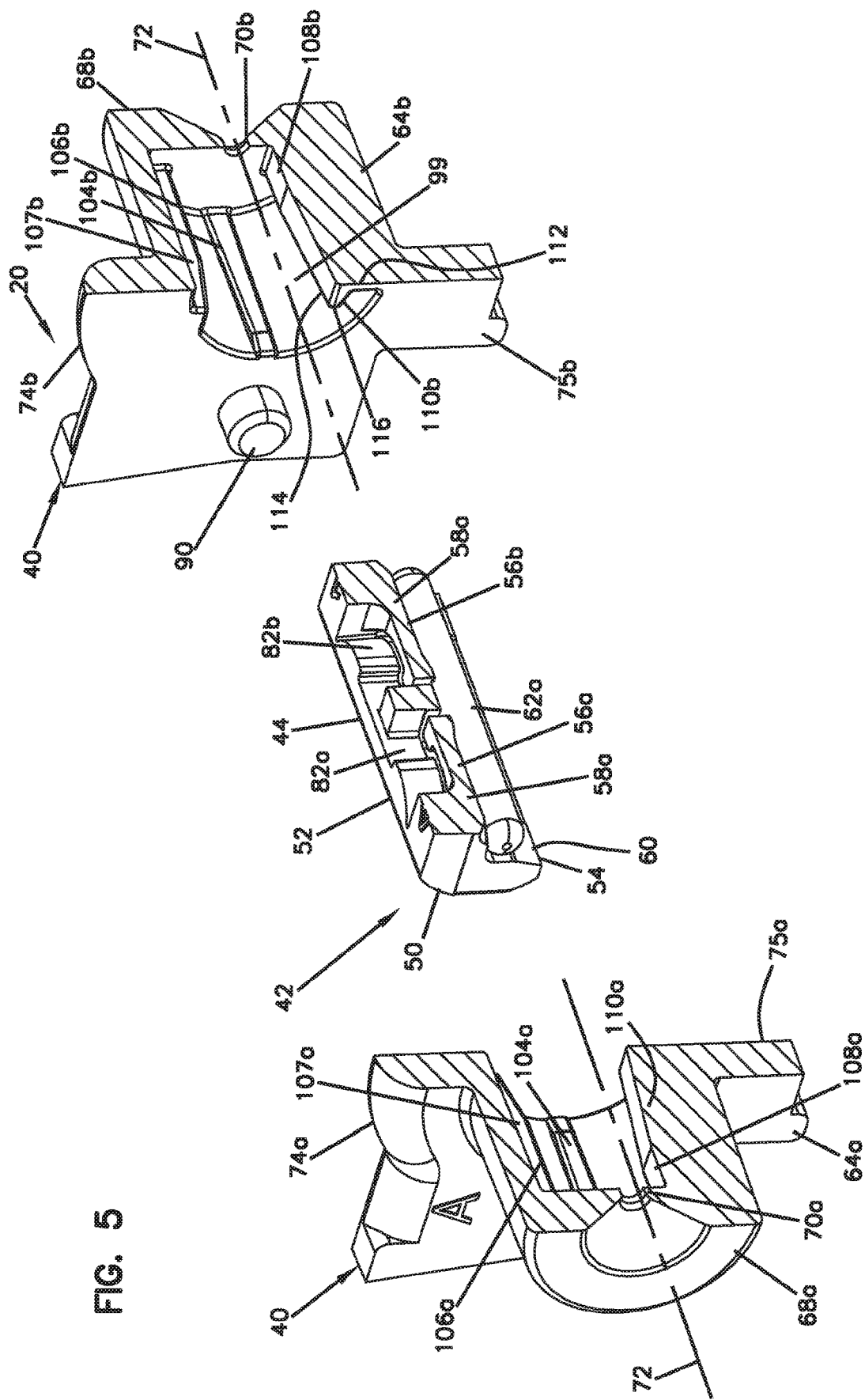
FIG. 5 is a cross-sectional view taken along section line 5-5 of FIG. 4.
Figure 6:
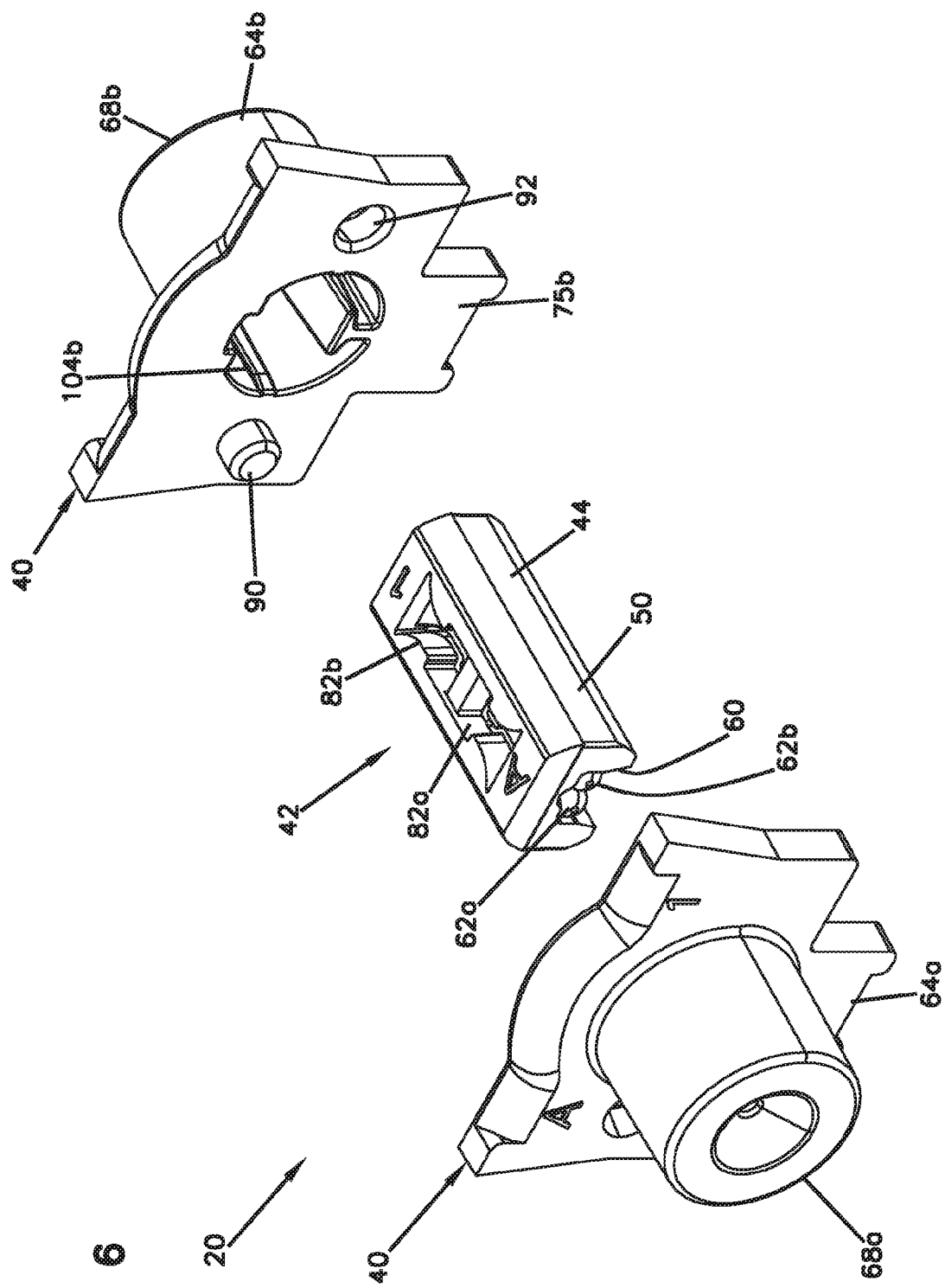
FIG. 6 is a perspective, exploded view of the fiber alignment device of FIG. 2.

Hardness as measured by a texture analyzer, or Voland hardness, and other properties of the gels may be measured using a Texture Technologies Texture Analyzer TA-XT2 commercially available from Texture Technologies Corp. of Scarsdale, N.Y., or like texture analyzer machines such as formerly produced by Voland/Stevens such as Texture Analyzer Model LFRA. The texture analyzer is equipped with a one-fourth inch (0.25 inch or 6.35 mm) stainless steel ball probe, a 5 gram trigger, and having a 100 g or a 1000 g load cell to measure force. For measuring the hardness of the gel materials of the present invention a 20 ml glass scintillating vial containing 10 grams of gel is placed in the Texture Analyzer and the stainless steel ball probe is forced into the gel at a speed of 0.2 mm/min to a penetration distance of 4.0 mm. The hardness value of the gel is the force in grams required to force the ball probe at that speed to penetrate or deform the surface of the gel the specified 4.0 mm. The Voland hardness, or hardness as measured by a texture analyzer, or Voland hardness, of a given sample may be directly correlated to the ASTM D217 cone penetration hardness and the procedure and a correlation is shown in FIG. 3 of U.S. Pat. No. 4,852,646, patent application Ser. No. 07/063,552 (Dittmer and Dubrow) filed Jun. 16, 1987. According to some embodiments, the cured index-matching gel has a hardness, as measured by a texture analyzer, or Voland hardness of between about 1 grams and 100 grams force, or between 1 g to 50 g force, between 2 g to 40 g force, between 5 g to 30 g force, or between 10 g to 20 g force.

The estimation of Mc, Average Molecular Weight between crosslinks, may be performed by the following method. A disc-shaped specimen of the cured organopolysiloxane gel composition (approximately 2.5 cm radius and 0.1 to 0.2 cm thick) is prepared and soaked in toluene (or other swelling agent for the cured organopolysiloxane gel and suitable extractant for the soluble components of the composition) for 2 to 3 days, periodically replenishing the toluene or other extractant (for example, twice a day). The swollen organopolysiloxane gel is then dried in a vacuum oven at about 60°-80° C. (or other suitable temperature) for 24 hours to remove the extractant. If necessary an intermediate exchange of the extractant with, for example, acetone may be used to facilitate and speed up removal of the extractant. This dried organopolysiloxane gel is then placed between parallel plates in a Rheometrics Mechanical Spectrometer (RMS) at 25°. The plateau modulus Gp (in dynes per cm$^2$) is then determined using a frequency rate of oscillation of the plates of 1 to 100 rad per second. From this modulus value a Mc can be calculated from the relation:

$$M_c=(d \times R \times T)/G_p$$

where d is the density (in g per cm$^3$) of the extracted organopolysiloxane gel, R is the gas constant and T is the absolute temperature.

In the case of gels which contain fillers, the contribution of the filler to the modulus must be taken into account. In this instance the measured modulus ($G_f$) is related to the modulus by:

$$(G_f)=GP(1+2.5\phi+14.1\phi^2)$$

where $G_p$ is the modulus contribution from the network alone in the absence of filler and .phi. is the volume fraction of the filler in the diluent free gel. The weight fraction of filler can be determined by Thermo-gravimetric analysis (TGA): this involves pyrolysing the crosslinked polymer composition and determining the residual weight of the filler. The crosslink density may be determined as follows the number of network segments per unit volume v is related to Mc by the following relation:

$$C=2/(M_c \times F)$$

If F is not known independently (through, for example, knowledge of the reactive ingredients from which the gel was produced) it is assumed to be 3. Unreacted reactive groups in a cured gel composition may be identified and their concentration estimate using a number of techniques such as infra-red absorption and nuclear magnetic resonance (NMR). At present the preferred method is solid state (usually proton) NMR. The chemical shifts observed can be used to identify the type of functional groups present; once the relaxation times are determined, their number can also be determined.

Comparative Example 1

Figure 15:
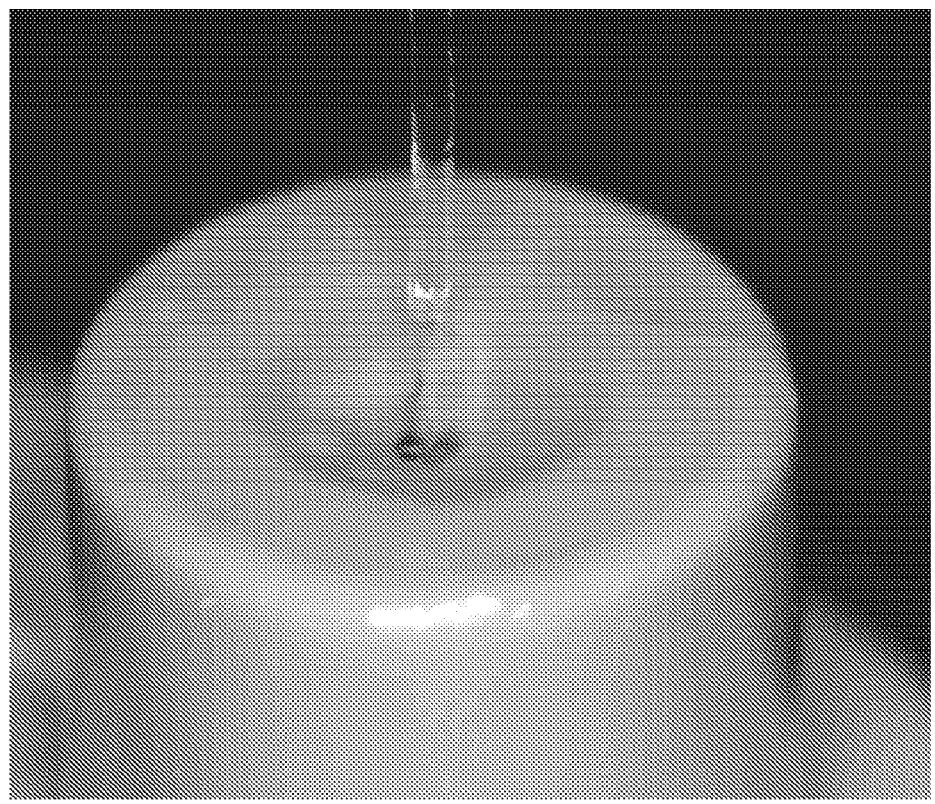
FIG. 15 is a photograph of a prior art thixotropic grease that achieves index match with good fiber release, but tracks after $6^{th}$ insertion of the optical fiber, as evident by residual hole after withdrawal of optical fiber.

Nyogel™ OC-431A-LVP is an index matching thixotropic grease for fiber optic connectors marketed by W. F. Nye, Inc. (New Bedford, Mass.). The Comparative Example 1 gel consists of 90% by weight silicone fluid and 10% fume silica thickener with 0.04% of 2,6-di-tert-butyl-p-cresol. Comparative Example 1 gel exhibits a refractive index at 589.3 nm of 1.46 by ASTM D-1218, viscosity at 25° C. of 11000 poises, and cone penetration of 243 (10$^{-1}$ millimeter) by ASTM D-217. However, Comparative Example 1 gel exhibits tracking following withdrawal of optical fiber after the sixth cycle, as shown in FIG. 15.

Example 2

This procedure describes in general terms the method used to make the formulations of the remaining examples, which comprise examples of the invention. They are each composed of two parts comprising various ingredients. All components are parts by weight. Unless otherwise specified, the ratio of part 1 and part 2 is 1:1; however to obtain various properties in the cured organopolysiloxane gels this ratio may be varied.

The components may be weighed on an analytical balance (accuracy+−0.01 g) then mixed with an overhead stirrer equipped with a propeller blade. The blended mixture may then cast into a 6"×6"×0.125" mold and cured at 120° C. for four hours in an air circulating oven. Three 20 ml scintillation vials may be filled with 12 g each of the mixture and cured under the same conditions. Cured organopolysiloxane gels of different hardnesses may prepared by varying the ratio of the two reactants (Table 1).

The hardness may be determined for each formulation using a Texture Technologies Texture Analyzer by the method provided herein above. Elongation may be measured using the procedures described in ASTM D419 where tensile bars are die cut from the molded slabs and elongation measured.

Part A:
35.000% organopolysiloxane −80,000 CSt divinyl terminated PDMS (such as Andisil VS 80K from AB Specialty Silicones),
64.917% non-reactive diluent-2,2,4,4,6,6-hexamethyl-8,8-diphenyl-cyclotetrasiloxane (Alfa Chemistry, US, ACM1693443), 0.083% Pt catalyst complex, Platinum 0-1,3 divinyl-1,1,3,3-tetramethyldisiloxane complex solution in vinyl terminated PDMS Part B:
34.894% organopolysiloxane 80,000 CSt divinyl terminated PDMS (such as Andisil VS 80K from AB Specialty Silicones),
64.977% non-reactive diluent 2,2,4,4,6,6-hexamethyl-8,8-diphenyl-cyclotetrasiloxane (Alfa Chemistry, US, ACM1693443),
0.052% Tetrakis (dimethylsiloxy) silane,
0.078% Phenyl Tris(dimethylsiloxy) silane The ingredients are weighed sequentially and then mixed as described above. The formulations may be poured into scintillation vials and cured to provide specimens for the hardness and stress relaxation measurements and also into a slab mold and cured to provide specimens for the other tests.

Example 3

Part A:
30.000% 80,000 CSt divinyl terminated PDMS dimethylpolysiloxane (Andisil VS 80,000 from AB Specialty Silicones),
15.000% 165,000 CSt divinyl terminated PDMS dimethylpolysiloxane (Andisil VS 165,000 from AB Specialty Silicones),
15.000% MV 2000 (mono functional vinyl dimethylpolysiloxane diluent from AB Specialty Silicones),
39.917% 2,2,4,4,6,6-hexamethyl-8,8-diphenyl-cyclotetrasiloxane diluent (Alfa Chemistry, US, ACM1693443),
0.083% Pt catalyst complex, Platinum 0-1,3 divinyl-1,1,3,3-tetramethyldisiloxane complex solution in vinyl terminated PDMS.

Part B:
29.894% divinyl terminated PDMS Andisil VS 80,000,
15.000% divinyl terminated PDMS Andisil VS 165,000,
15.000% mono functional vinyl diluent (MV 2000 from AB Specialty Silicones),
39.977% 2,2,4,4,6,6-hexamethyl-8,8-diphenyl-cyclotetrasiloxane (Alfa Chemistry, US, ACM1693443),
0.080% Tetrakis (dimethylsiloxy) silane,
0.0508% Phenyl Tris(dimethylsiloxy) silane.

The ingredients are weighed sequentially and then mixed as described above. The formulations may be poured into scintillation vials and cured to provide specimens for the hardness and stress relaxation measurements and also into a slab mold and cured to provide specimens for the other tests.

Example 4

Part A: 45.000% 80,000 CSt divinyl terminated PDMS (Andisil VS 80K from AB Specialty Silicones),
10.000% divinyl terminated PDMS Andisil VS 165,000,
5.000% mono functional vinyl diluent (MV 2000 from AB Specialty Silicones),
39.917% 1,3,5-triphenyltrimethylcyclotrisiloxane, CAS RN 546-45-2, available from GELEST, Morrisville, Pa., Product Code: SIT8705.0
0.083% Pt catalyst complex, Platinum 0-1,3 divinyl-1,1,3,3-tetramethyldisiloxane complex solution in vinyl terminated PDMS.
Part B:
44.894% divinyl terminated PDMS Andisil VS 80,000,
10.000% divinyl terminated PDMS Andisil VS 165,000,
5.000% mono functional vinyl diluent (MV 2000 from AB Specialty Silicones),
39.977% 1,3,5-triphenyltrimethylcyclotrisiloxane, CAS RN 546-45-2, available from GELEST, Morrisville, Pa., Product Code: SIT8705.0,
0.0608% Tetrakis (dimethylsiloxy) silane,
0.072% Phenyl Tris(dimethysiloxy) silane The ingredients are weighed sequentially and then mixed as described above. The formulations may be poured into scintillation vials and cured to provide specimens for the hardness and stress relaxation measurements and also into a slab mold and cured to provide specimens for the other tests.

Example 5

Part A:
45.000% 80,000 CSt divinyl terminated PDMS (Andisil VS 80K from AB Specialty Silicones),
10.000% divinyl terminated PDMS Andisil VS 165,000,
5.000% mono functional vinyl diluent (MV 2000 from AB Specialty Silicones),
39.917% 1,1-diphenyltetramethylcyclotrisiloxane, CAS RN 1693-51-2, available from ChemTik, Berlin, Germany, Product Code: CTK4D3277
0.083% Pt catalyst complex, Platinum 0-1,3 divinyl-1,1,3,3-tetramethyldisiloxane complex solution in vinyl terminated PDMS.
Part B:
44.894% divinyl terminated PDMS Andisil VS 80,000,
10.000% divinyl terminated PDMS Andisil VS 165,000,
5.000% mono functional vinyl diluent (MV 2000 from AB Specialty Silicones),
39.977% 1,1-diphenyltetramethylcyclotrisiloxane, CAS RN 1693-51-2, available from ChemTik, Berlin, Germany, Product Code: CTK4D3277,
0.0608% Tetrakis (dimethylsiloxy) silane,
0.072% Phenyl Tris(dimethysiloxy) silane The ingredients are weighed sequentially and then mixed as described above. The formulations may be poured into scintillation vials and cured to provide specimens for the hardness and stress relaxation measurements and also into a slab mold and cured to provide specimens for the other tests.

Example 6

A gel was formulated without non-reactive diluent in order to first assess and tune self-healing and self-cleaning characteristics.

Part A:
98.517% 5,000 CSt divinyl terminated PDMS (Andisil VS 5K from AB Specialty Silicones),
0.4% Dynasylan 40 (ethyl polysilicate, 40-42% silicon hydroxide) CTK4D3277
0.083% Pt catalyst complex, Platinum 0-1,3 divinyl-1,1,3,3-tetramethyldisiloxane complex solution in vinyl terminated PDMS.
Part B:
97.36% divinyl terminated PDMS (Andisil VS 5,000: CTK4D3277),
0.30% Tetrakis (dimethylsiloxy) silane,
2.34% Hydride terminated polydimethylsiloxane, 2-3 cSt, 0.5 wt % hydride The ingredients are weighed sequentially and then mixed as described above. The formulations may be poured into scintillation vials and cured to provide specimens for the hardness and stress relaxation measurements and also into a slab mold and cured to provide specimens for the other tests.

The gel formulations being used can hold a quantity of soluble diluent, without significant bleed-out or gel property change. The high index of refraction non-reactive diluents are used to adjust the index of refraction of the gel to the desired level.

Example 7

Discrete product applications may require a differing levels of "self-healing" and "self-cleaning" characteristic, depending upon geometry, fiber diameter, gel reservoir geometry, and environment. The ability to tune these properties by adjusting the Part A to Part B ratio was investigated.

Self-healing gels that do not exhibit tracking or tear-out upon insertion and withdrawal of an optical fiber were desirable. "Tracking" and "Tear-Out" observations were made using video imaging using a mounted gel substrate on a ThorLabs optical bench stage and a mounted a square cleaved optical fiber on an aligned ThorLabs optical bench stage. The bench geometry allowed the square cleaved optical fiber to be moved in and out of the gel under observation. For example, the optical fiber was inserted and withdrawn from the sample gel multiple times and the gel characteristics were recorded by video photography. For example, one cycle of insertion and withdrawal of the fiber from the cured gel was performed every minute for at least 12 cycles. Initial work performed was performed with the gel mounted in the Fiber Alignment Housing, later work performed with gel mounted between two glass slides.

Figure 14:
FIG. 14 is a photograph of a prior art cross-linked gel that achieves index-match and reseal, but exhibits gel tear-out after $4^{th}$ insertion of the optical fiber.

With the gel mounted in Fiber Alignment Housings, the gel was in a possible geometry of use, but the performance of the gel below the surface was difficult to observe. For example, when viewed in the Fiber Alignment Housing, typical gel performance appears in FIGS. 14 and 15. Prior art commercial cross-linked gels, for example, NYOGEL® OCK-451A (Nye Lubricants, Inc., Fairhaven Mass.), can achieve index match, and re-seal, but one problem is they may start to exhibit tear-out after a number of cycles. An example is shown in FIG. 14, prior art cross-linked gel exhibiting tear-out as evidenced by traces of gel visually apparent along the withdrawn optical fiber.

Prior art commercial thixotropic greases, for example NYOGEL® OC431A LVP, can exhibit good index-match, with good fiber release, but may exhibit another problem in that they fail to self-heal as exhibited by tracking or passage evident after a number of cycles. For example, as shown in FIG. 15, prior art thixotropic grease exhibits tracking after withdrawal of the optical fiber, thus fails to adequately self-heal.

Figure 16:
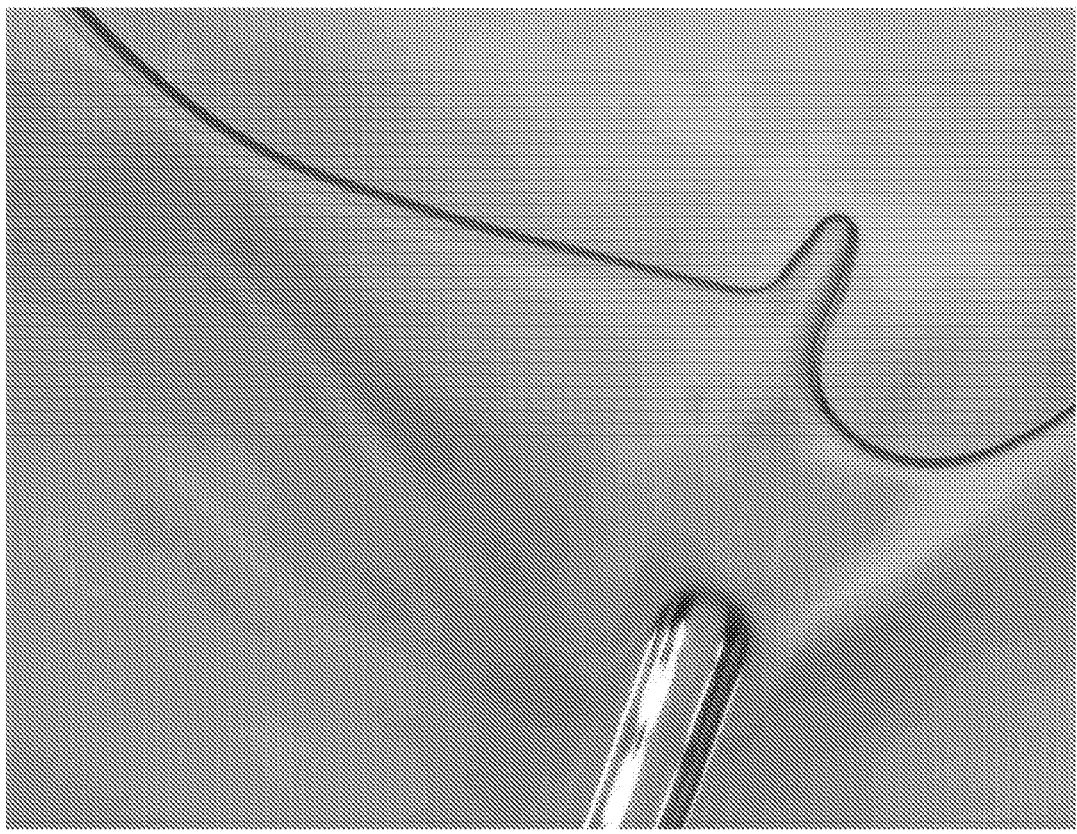
FIG. 16 shows a photograph of prior art thixotropic grease placed between two glass slides exhibiting tracking after withdrawal of optical fiber.
Figure 17A:
FIG. 17A shows cured gel of example 6 using a Part A:Part B ratio of 1.00:1.04 immediately after withdrawal of optical fiber. No tracking or tear-out of the gel is observed, but a dimple is temporarily observed at the exit point.
Figure 17B:
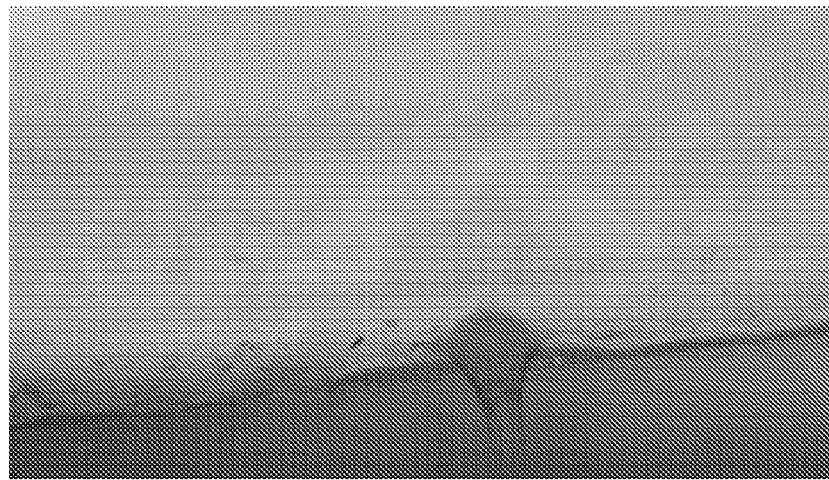
FIG. 17B shows cured gel of example 6 using a Part A:Part B ratio of 1.04:1.00 immediately after withdrawal of optical fiber. No tracking or tear-out of the gel is observed, but a dimple is temporarily observed at the exit point. Some draw-out is observed that snaps back to gel matrix within 2-3 seconds.
Figure 17C:
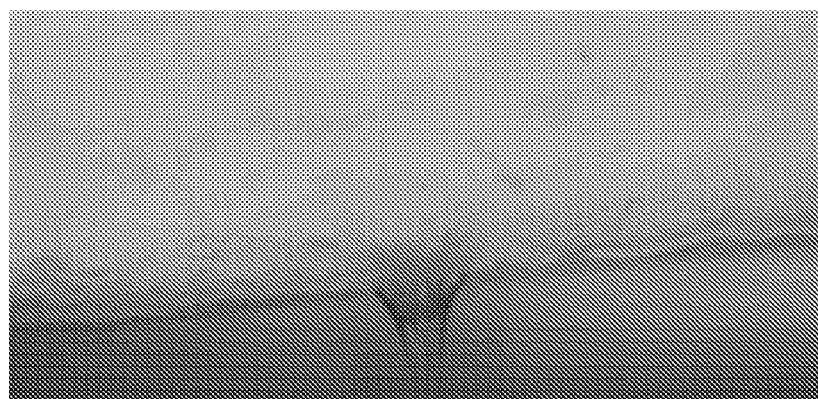
FIG. 17C shows cured gel of example 6 using a Part A:Part B ratio of 1.06:1.00 immediately after withdrawal of optical fiber. No tracking or tear-out of the gel is observed, but a dimple is temporarily observed at the exit point. Some draw-out is observed that snaps back to gel matrix within 10-12 seconds.

The protocol was modified to improve observation of gel behavior. With gel mounted between two glass slides, the gel behavior below the penetration surface was able to be observed. When viewed between two glass slides, the gel behavior appears as shown in FIG. 16, in which the prior art thixotropic grease exhibits tracking similar to FIG. 15. In addition, although the material does not tear out, the fiber is coated with grease.

The gel according to Example 6 was prepared using various ratios of Part A to Part B. As shown in the Table 1, repeated insertion and withdrawal of optical fiber from cured gels at ambient room temperature for at least 12 cycles resulted in no tracking and no tear-out of the gel.

TABLE 1

Tracking and Tear-out observations for Cured Gels of Example 6

| Part A:Part B | FIG. | Tracking | Tear-out |
|---|---|---|---|
| example 6.1 1.00:1.04 | 17A | None observed Dimple observed in gel at exit point. | None observed |
| example 6.2 1.04:1.00 | 17B | None observed Dimple observed in gel at exit point. | "Draw-Out" observed, that snaps back to gel matrix in 2-3 seconds. |
| example 6.3 1.06:1.00 | 17C | None observed Dimple observed in gel at exit point, | "Draw-Out" observed, that snaps back to gel matrix in 10-12 seconds. |

Example 8

Figure 18A:
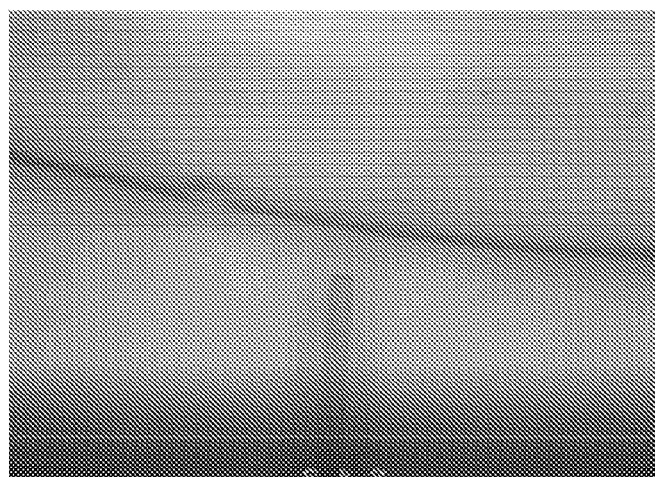
FIG. 18A shows initial image of dust coated optical fiber prior to insertion to cured gel according to example 6.
Figure 18B:
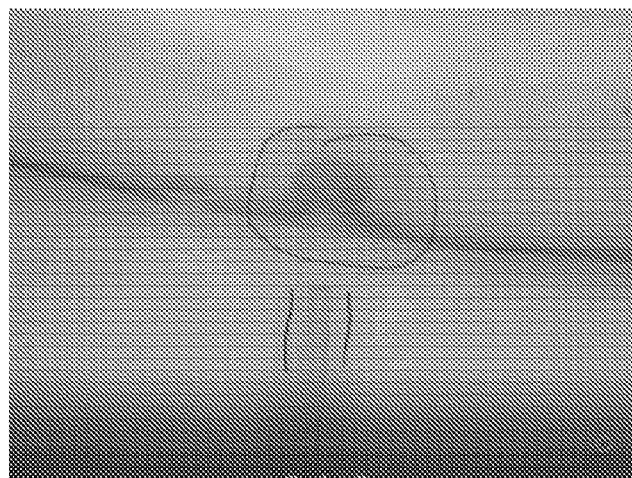
FIG. 18B shows image of dust coated optical fiber after insertion and removal from self-cleaning cured gel according to example 6.

The polysiloxane gels of the disclosure were subjected to self-cleaning evaluation. Dust selection and evaluation method is described in this example. Many types of particulate contamination and dust can adversely affect optical connector performance. Many tests exist to assess the performance of product after exposure to a dust bearing environment. One such test is identified in Telcordia GR-326-CORE "Generic Requirements for Singlemode Optical Connectors and Jumper Assemblies", section 4.4.4.1 "Dust Test", which specifies the use of ISO 12103-1 "Test dust for filter evaluation—Part 1: Arizona test dust", type A2 "fine test dust" was used for this evaluation. For this evaluation, an optical fiber was coated with ISO 12103-1 type A2 "fine test dust" and then observed the action taken on the dust by the gel. Results are shown in FIGS. 18A-D. FIG. 18A shows an initial image where the fiber is coated with dust. FIG. 18B shows the fiber after insertion to the cured gel according to example 6.1 using a Part A:Part B ratio of 1.00:1.04; dust removal from optical fiber is observed in the marked region along the fiber and dust transfer to the gel face is observed in the gel at the circled region. Therefore, the gel according to example 6.1 was observed to be self-cleaning.

Figure 18C:
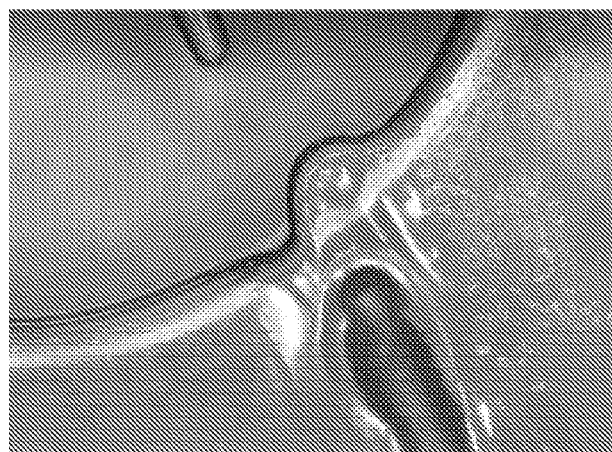
FIG. 18C shows initial image of dust coated optical fiber prior to insertion to prior art gel grease.
Figure 18D:
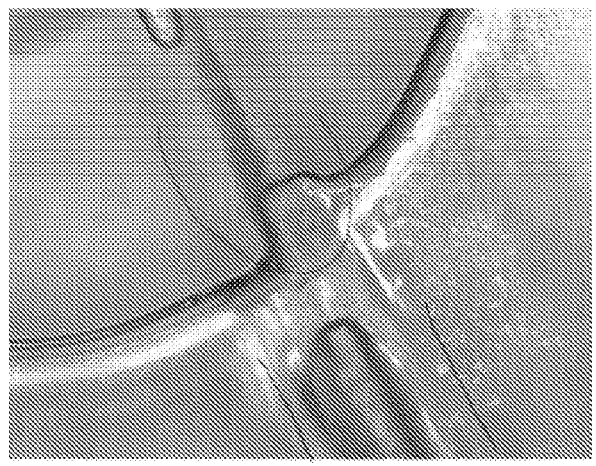
FIG. 18D shows image of dust coated optical fiber after insertion and removal from prior art gel grease where dust still appears on optical fiber.

For comparison, prior art thixotropic grease is shown prior to fiber insertion in FIG. 18C, with dust shown along the optical fiber. After fiber is inserted and withdrawn from the prior art, dust still appears on the optical fiber observed in the horizontal lines along the fiber at the marked region. Dust was transferred to the grease, but was deposited along the circled track region. Therefore, the gel according to example 6.1 was observed to be self-cleaning, whereas prior art thixotropic grease exhibited tracking and insufficient self-cleaning properties.

What is claimed is:

1. An optical fiber alignment system comprising:
an alignment device defining a fiber insertion axis extending between first and second ends of the alignment device, the alignment device also defining a fiber alignment region positioned along the fiber insertion axis; and
a cured refractive index-matching gel composition positioned within the fiber alignment region, wherein an optical fiber to be aligned penetrates through the gel, wherein the cured refractive index-matching gel composition comprises
a crosslinked polysiloxane, and
a nonreactive polysiloxane diluent,
wherein the nonreactive polysiloxane diluent comprises a cyclosiloxane having at least one phenyl substituent, optionally wherein the diluent is selected from the group consisting of a diphenyl cyclotrisiloxane (D3), triphenyl cyclotrisiloxane (D3), diphenyl cyclotetrasiloxane (D4), tetraphenyl cyclotetrasiloxane (D4), hexaphenyl cyclotetrasiloxane (D4), diphenyl cyclopentasiloxane (D5), tetraphenyl cyclopentasiloxane (D5), hexaphenyl cyclopentasiloxane (D5), diphenyl cyclohexasiloxane (D6), tetraphenyl cyclohexasiloxane (D6), hexaphenyl cyclohexasiloxane (D6), diphenyl cycloheptasiloxane (D7), tetra phenyl cycloheptasiloxane (D7), and hexaphenyl cycloheptasiloxane (D7).

2. The optical fiber alignment system of claim 1, wherein the cured refractive index-matching gel composition comprises
the crosslinked polysiloxane, and
the nonreactive polysiloxane diluent, wherein the refractive index of the diluent is higher than the refractive index of the crosslinked polysiloxane.

3. The optical fiber alignment system of claim 1, wherein the cured refractive index-matching gel composition is self-healing as indicated by re-seal to be liquid tight upon water submersion after at least 10 seconds following removal of a 125 micron optical fiber from the gel composition within a connector.

4. The optical fiber alignment system of claim 1, wherein the crosslinked polysiloxane is prepared from a polysiloxane composition comprising
a first reactive polysiloxane component, and
a second reactive component capable of reacting with and curing the first component.

5. The optical fiber alignment system of claim 4, wherein the first reactive polysiloxane component has at least two reactive groups.

6. The optical fiber alignment system of claim 5, wherein the first reactive polysiloxane component is selected from one or more of the group consisting of hydroxy-, alkoxy-, acyloxy-, amino-, oxime-, hydrogen- and vinyl-terminated polydimethylsiloxanes, and dihydroxy-, diacyloxy-, diamino-, dioxime-, dialkoxy-, dihydrogen- and divinyl-terminated polydimethylsiloxanes and hydroxy-, alkoxy-, acyloxy-, amino-, oxime-, hydrogen- and vinyl-dimethyl and dihydroxy-, diacyloxy-, diamino-, dioxime-, dialkoxy-, dihydrogen- and divinyl-terminated dimethylsiloxane copolymers with diphenyl siloxanes.

7. The optical fiber alignment system of claim 4, wherein the second reactive component has al least three reactive groups, or at least four reactive groups.

8. The optical fiber alignment system of claim 7, wherein the second reactive component is selected from the group consisting of tetrakis(dimethylsiloxy) methyltris(dimethylsiloxy)silane, phenyl-tris(dimethylsiloxy)silane, tetraethoxysilane, tetramethoxysilane, phenyl triethoxysilane, methyl triethoxysilane, phenyl triacetoxysilane, 1,3,5-trimethyl-trivinyl cyclotrisiloxane, 1,3,5,7-tetramethyltetravinyl cyclotetrasiloxane, and 1,3,5,7-tetra-methylcyclotetrasiloxane.

9. The optical fiber alignment system of claim 4, wherein the polysiloxane composition further comprises one or more additives selected from the group consisting of catalysts, antioxidants, moisture scavengers, antimicrobials, flame retardants, corrosion inhibitors, UV light stabilizers, fungicides, cure inhibitors, tackifiers, and nanoparticles.

10. The optical fiber alignment system of claim 9, wherein the nanoparticles are selected from amorphous silica particles having mean diameter in the range of from 1 nm to no more than 500 nm.

11. The optical fiber alignment system of claim 1, wherein the cured refractive index-matching gel does not exhibit tracking or tear-out of the gel for at least 6 cycles, at least 8 cycles, or at least 12 cycles after inserting and withdrawing an optical fiber from the cured refractive index-matching gel.

12. The optical fiber alignment system of claim 1, wherein the nonreactive polysiloxane diluent is selected from the group consisting of 1,1-diphenyltetramethylcyclotrisiloxane, 1,3,5-triphenyltrimethylcyclotrisiloxane, 2,2,4,4,6,6-hexamethyl-8,8-diphenyl-cyclotetrasiloxane, octamethyl-diphenyl-cyclopentasiloxane, decamethyl diphenyl cyclohexasiloxane, tetramethyltetraphenyl-cyclotetrasiloxane, and hexamethyl tetraphenyl-cyclopentasiloxane.

13. The optical fiber alignment system of claim 1, wherein the crosslinked polysiloxane has an average molecular weight between crosslinks of at least 15,000.

14. The optical fiber alignment system of claim 13, wherein the crosslinked polysiloxane has an average molecular weight between crosslinks of at least 20,000.

15. The optical fiber alignment system of claim 1, wherein the gel composition comprises 40% up to about 90% by weight of the nonreactive polysiloxane diluent based on the combined weights of the crosslinked polysiloxane and the nonreactive polysiloxane diluent.

16. The optical fiber alignment system of claim 1, wherein the refractive index-matching polymer gel composition exhibits
   i. a hardness as measured by a texture analyzer, or Voland hardness, is in the range of from 1 g to 50 g;
   ii. an ultimate elongation of at least about 100%; and
   iii. a refractive index in the range of from 1.31 to 1.60 at 1550 nm by ASTM D-1218.

17. The optical fiber alignment system of claim 16, wherein the refractive index-matching polymer gel composition exhibits
   i. a hardness as measured by a texture analyzer, or Voland hardness, is in the range of from 5 g to 30 g;
   ii. an ultimate elongation of at least about 400%; and
   iii. a refractive index in the range of from 1.40 to 1.48 at 1550 nm by ASTM D-1218.

18. The optical fiber alignment system of claim 1, wherein the cured refractive index-matching gel composition is self-healing as indicated by re-seal to be liquid tight upon water submersion after at least 10 seconds following removal of a 125 micron optical fiber from the gel composition within a connector.

19. The optical fiber alignment system of claim 1, wherein the fiber alignment region defines an alignment groove and a cantilever arm to axially align the optical fibers in the alignment groove.

20. A cured refractive index-matching polymer gel composition comprising
   a crosslinked polysiloxane polymer, and
   a nonreactive diluent, wherein the refractive index of the diluent is higher than the refractive index of the crosslinked polymer,
   wherein the nonreactive diluent is a cyclopolysiloxane having a refractive index higher than the crosslinked polysiloxane wherein the cyclopolysiloxane is selected from a diphenyl cyclotrisiloxane (D3); triphenyl cyclotrisiloxane (D3), diphenyl cyclotetrasiloxane (D4), tetraphenyl cyclotetrasiloxane (D4), hexaphenyl cyclotetrasiloxane (D4); methyl cyclopentasiloxane (D5), diphenyl cyclopentasiloxane (D5), tetraphenyl cyclopentasiloxane (D5), hexaphenyl cyclopentasiloxane (D5); methyl cyclohexasiloxane (D6), diphenyl cyclohexasiloxane (D6), tetraphenyl cyclohexasiloxane (D6), hexaphenyl cyclohexasiloxane (D6); diphenyl cycloheptasiloxane (D7), or a mixture thereof, and
   wherein the cured refractive index-matching polymer gel does not exhibit tracking or tear-out of the gel for at least 12 cycles after inserting and withdrawing an optical fiber from the gel.

21. The cured refractive index-matching polymer gel composition of claim 20, wherein the cured refractive index-matching gel composition is prepared from a two-part composition comprising a part A and a part B, wherein part A and part B are mixed in a ratio of from about 2:1 to 1:2; 1.5:1 to 1:1.5, 1.1:1 to 1:1.1, or 1.05:1 to 1:1.05 part:part B and cured.

22. A method for preparing a crosslinked organopolysiloxane gel which comprises reacting together a composition comprising:
   a) an organopolysiloxane containing first reactive groups; and
   b) at least one compound containing second reactive groups, wherein said second reactive groups in the compound being capable of reacting with said first reactive groups in the organopolysiloxane, and
   c) a non-reactive polysiloxane diluent,
   wherein the nonreactive polysiloxane diluent is a cyclopolysiloxane having a refractive index higher than the organopolysiloxane wherein the cyclopolysiloxane is selected from a diphenyl cyclotrisiloxane (D3); triphenyl cyclotrisiloxane (D3), diphenyl cyclotetrasiloxane (D4), tetraphenyl cyclotetrasiloxane (D4), hexaphenyl cyclotetrasiloxane (D4); methyl cyclopentasiloxane (D5), diphenyl cyclopentasiloxane (D5), tetraphenyl cyclopentasiloxane (D5), hexaphenyl cyclopentasiloxane (D5); methyl cyclohexasiloxane (D6), diphenyl cyclohexasiloxane (D6), tetraphenyl cyclohexasiloxane (D6), hexaphenyl cyclohexasiloxane (D6); diphenyl cycloheptasiloxane (D7), or a mixture thereof.

23. The method of claim 22, wherein the non-reactive polysiloxane diluent is inert to said first and said second reactive groups, in an amount of from at least about 40% by weight to about 95% by weight of the combined weights of said diluent, said organopolysiloxane, and said compound.

24. The method of claim 23, wherein the cyclopolysiloxane is selected from the group consisting of 1,1-diphenyltetramethylcyclotrisiloxane, 1,3,5-triphenyltrimethylcyclotrisiloxane, 2,2,4,4,6,6-hexamethyl-8,8-diphenyl-cyclotetrasiloxane, octamethyldiphenyl-cyclopentasiloxane, decamethyl diphenyl cyclohexasiloxane, tetramethyltetraphenyl-cyclotetrasiloxane, and hexamethyl tetraphenyl-cyclopentasiloxane.

\* \* \* \* \*